US010335720B2

(12) United States Patent
Pomerleau

(10) Patent No.: US 10,335,720 B2
(45) Date of Patent: Jul. 2, 2019

(54) OPTIMIZATION OF VACUUM SYSTEM AND METHODS FOR DRYING DRILL CUTTINGS

(71) Applicant: FP Marangoni Inc., Calgary (CA)

(72) Inventor: Daniel Guy Pomerleau, Calgary (CA)

(73) Assignee: FP Marangoni Inc., Calgary (CA)

(*) Notice: Subject to any disclaimer, the term of this patent is extended or adjusted under 35 U.S.C. 154(b) by 338 days.

(21) Appl. No.: 14/877,013

(22) Filed: Oct. 7, 2015

(65) Prior Publication Data

US 2016/0023141 A1    Jan. 28, 2016

Related U.S. Application Data

(63) Continuation of application No. 14/671,768, filed on Mar. 27, 2015, which is a continuation of application
(Continued)

(51) Int. Cl.
| | | |
|---|---|---|
| *F26B 5/14* | (2006.01) |
| *B01D 33/74* | (2006.01) |
| *B01D 33/03* | (2006.01) |
| *B07B 1/28* | (2006.01) |
| *B07B 13/16* | (2006.01) |

(Continued)

(52) U.S. Cl.
CPC ....... *B01D 33/745* (2013.01); *B01D 19/0073* (2013.01); *B01D 33/0096* (2013.01); *B01D 33/0353* (2013.01); *B01D 33/0376* (2013.01); *B01D 33/801* (2013.01); *B07B 1/28* (2013.01); *B07B 13/16* (2013.01); *E21B 21/065* (2013.01); *F26B 5/12* (2013.01); *F26B 20/00* (2013.01); *B01D 2201/204* (2013.01)

(58) Field of Classification Search
CPC ........ B01D 21/28; B01D 3/106; B01D 3/108; B01D 2201/204; B01D 2201/202; B01D 33/745; B01D 33/747; B01D 33/0096; B01D 33/03; B01D 33/0353; B01D 33/0361; E21B 2021/007; E21B 21/01; F26B 5/12; F26B 13/103; F26B 17/045
USPC .................................... 34/397, 401, 361, 92
See application file for complete search history.

(56) References Cited

U.S. PATENT DOCUMENTS

| | | | |
|---|---|---|---|
| 2,161,500 A | | 6/1939 | Bird et al. |
| 2,462,878 A | * | 3/1949 | Logue ................... B01D 35/20 209/269 |

(Continued)

FOREIGN PATENT DOCUMENTS

| | | |
|---|---|---|
| CA | 970724 A | 7/1975 |
| CA | 2664173 A1 | 4/2008 |

(Continued)

OTHER PUBLICATIONS

Australian Office Action Australian Application No. 2009310586 dated Feb. 12, 2016 5 pages.
(Continued)

*Primary Examiner* — John P McCormack
(74) *Attorney, Agent, or Firm* — Whitmyer IP Group LLC

(57) ABSTRACT

Systems and methods for separating fluids from drill cuttings. Specifically, the invention relates to shakers that incorporate a vacuum system and methods of operating such systems to effect a high degree of fluid separation. The system and methods are effective across a variety of screen sizes, vacuum flows and vacuum designs.

17 Claims, 18 Drawing Sheets

Related U.S. Application Data

No. 13/622,216, filed on Sep. 18, 2012, now Pat. No. 9,015,959, which is a continuation of application No. PCT/CA2010/000501, filed on Mar. 31, 2010.

(60) Provisional application No. 61/315,357, filed on Mar. 18, 2010.

(51) Int. Cl.
    *F26B 5/12*     (2006.01)
    *F26B 20/00*     (2006.01)
    *B01D 19/00*     (2006.01)
    *B01D 33/80*     (2006.01)
    *E21B 21/06*     (2006.01)
    *B01D 33/00*     (2006.01)

(56) References Cited

U.S. PATENT DOCUMENTS

| | | | |
|---|---|---|---|
| 2,793,996 A | | 5/1957 | Lummus |
| 3,929,642 A | | 12/1975 | Ennis et al. |
| 3,970,552 A | | 7/1976 | Bongert |
| 4,197,657 A | * | 4/1980 | Leino ............ F26B 3/04 34/406 |
| 4,298,572 A | | 11/1981 | Moffet et al. |
| 4,350,591 A | | 9/1982 | Lee |
| 4,387,514 A | | 6/1983 | McCaskill, Jr. |
| 4,397,659 A | | 8/1983 | Gowan et al. |
| 4,492,862 A | | 1/1985 | Grynberg et al. |
| 4,546,783 A | | 10/1985 | Lott |
| 4,635,735 A | | 1/1987 | Crownover |
| 4,639,258 A | | 1/1987 | Schellstede et al. |
| 4,725,352 A | | 2/1988 | Haliotis |
| 4,750,920 A | | 6/1988 | Manuel et al. |
| 5,098,586 A | | 3/1992 | Rudolph |
| 5,341,882 A | | 8/1994 | Hale |
| 5,853,583 A | | 12/1998 | Shah |
| 5,890,549 A | * | 4/1999 | Sprehe ............ E21B 21/01 169/69 |
| 6,092,390 A | | 7/2000 | Griffith, Jr. |
| 6,164,380 A | | 12/2000 | Davis |
| 6,170,580 B1 | | 1/2001 | Reddoch |
| 6,389,878 B1 | | 5/2002 | Zamfes |
| 6,478,923 B1 | * | 11/2002 | Igarashi ............ C23C 16/4412 118/715 |
| 6,530,438 B1 | | 3/2003 | McIntyre |
| 6,607,659 B2 | | 8/2003 | Hensley et al. |
| 7,096,942 B1 | | 8/2006 | de Rouffignac et al. |
| 7,740,761 B2 | | 6/2010 | Bailey |
| 7,767,628 B2 | | 8/2010 | Kippie et al. |
| 8,394,270 B2 | | 3/2013 | Vasshus et al. |
| 8,613,360 B2 | | 12/2013 | Carr |
| 9,004,288 B2 | | 4/2015 | Carr |
| 9,074,440 B2 | | 7/2015 | Carr |
| 2002/0056667 A1 | | 5/2002 | Baltzer et al. |
| 2003/0131700 A1 | | 7/2003 | Balz et al. |
| 2004/0154963 A1 | | 8/2004 | Rayborn |
| 2005/0082236 A1 | | 4/2005 | Derrick et al. |
| 2005/0183994 A1 | * | 8/2005 | Hensley ............ B07B 1/46 209/238 |
| 2006/0016768 A1 | | 1/2006 | Grichar et al. |
| 2006/0096119 A1 | * | 5/2006 | Schellstede ............ E21B 21/066 34/523 |
| 2006/0113220 A1 | | 6/2006 | Scott |
| 2006/0254421 A1 | | 11/2006 | Boone |
| 2007/0245839 A1 | | 10/2007 | Rieberer |
| 2008/0078699 A1 | | 4/2008 | Carr |
| 2008/0078700 A1 | | 4/2008 | Jones et al. |
| 2010/0012556 A1 | | 1/2010 | Pohle |
| 2011/0094950 A1 | * | 4/2011 | Dahl ............ B07B 1/4618 210/85 |
| 2011/0284481 A1 | | 11/2011 | Pomerleau |
| 2012/0279932 A1 | | 11/2012 | Pomerleau |
| 2013/0074360 A1 | | 3/2013 | Pomerleau |
| 2013/0092637 A1 | | 4/2013 | Pomerleau |
| 2014/0091028 A1 | | 4/2014 | Pomerleau |

FOREIGN PATENT DOCUMENTS

| | | |
|---|---|---|
| CA | 2712774 A | 11/2010 |
| CN | 101553322 A | 10/2009 |
| GB | 2089403 A | 6/1982 |
| RU | 2021038 C1 | 10/1994 |
| SU | 99315 A1 | 11/1953 |
| SU | 297691 | 3/1971 |
| SU | 391868 A1 | 7/1973 |
| SU | 1260505 A1 | 9/1986 |
| WO | 2005054623 A1 | 6/2005 |
| WO | 2008042860 A2 | 4/2008 |
| WO | 2010048718 A1 | 5/2010 |
| WO | 2011113132 A1 | 9/2011 |
| WO | 2011140635 A2 | 11/2011 |

OTHER PUBLICATIONS

Second Office Action from China Application No. 201080066711.9 dated Feb. 9, 2015 21 pages.
International Search Report & Written Opinion of the International Searching Authority; Application No. PCT/CA2010/000501; Issued May 19, 2010; dated Jul. 20, 2010; 9 pages.
International Search Report & Written Opinion of the International Searching Authority Application No. PCT/CA2011/000542 Completed: Sep. 21, 2011; dated Oct. 25, 2011 12 pages.
Document from Impeachment Proceedings Related to Canadian Patent No. 2,712,774; Reply to Defence and Counterclaim dated Feb. 21, 2013; 7 pages.
Office Action from Russia Application No. 2012 153 393 dated Apr. 28, 2015 7 pages (translation included).
Office Action from Russia Application No. 2011 120 971 dated Dec. 19, 2013 12 pages (translation included).
Office Action & English Translation Russian Patent Application No. 2011120971 dated May 8, 2013.
Document from Impeachment Proceedings Related to Canadian Patent No. 2,712,774; Statement of Claim dated Oct. 26, 2012; 82 pages.
Document from Impeachment Proceedings Related to Canadian Patent No. 2,712,774; Statement of Defence and Counterclaim dated Dec. 21, 2012; 13 pages.
Office Action from the U.S. Appl. No. 13/098,014 dated Oct. 23, 2014 27 pages.
Office Action from the U.S. Appl. No. 13/551,194 dated Oct. 8, 2014 13 pages.
U.S. Office Action U.S. Appl. No. 14/671,768 19 pages.

* cited by examiner

COST ANALYSIS-PROCESSED VS UNPROCESSED CUTTINGS

VACUUM ANALYSIS

| HOLE LENGTH (m) | HOLE SIZE (m) | SPECIFIC GRAVITY (kg/m³) | SECTION VOL (m³) | OIL TO CUTTINGS WT% | FLUID LOST (kg) | ASG (kg/m³) | LOST (m³) | PRICE ($) | TOTAL COST ($) | DAYS | COST/DAY ($) |
|---|---|---|---|---|---|---|---|---|---|---|---|
| 1700 | 0.222 | 2750 | 66 | 13.1 | 23850 | 820 | 29.09 | $900 | $26,177 | 8 | $3,272 |
| 1000 | 0.159 | 2750 | 20 | 13.1 | 7197 | 820 | 8.78 | $900 | $7,899 | 8 | $987 |
| TOTALS | | | | | | | 38 | | $34,076 | 16 | $2,130 |

UN-VACUUMED ANALYSIS

| HOLE LENGTH (m) | HOLE SIZE (m) | SPECIFIC GRAVITY (kg/m³) | SECTION VOL (m³) | OIL TO CUTTINGS WT% | FLUID LOST (kg) | ASG (kg/m³) | LOST (m³) | PRICE ($) | TOTAL COST ($) | DAYS | COST/DAY ($) |
|---|---|---|---|---|---|---|---|---|---|---|---|
| 1700 | 0.222 | 2750 | 66 | 16.0/0 | 28953 | 820 | 35.31 | $900 | $31,778 | 8 | $3,972 |
| 1000 | 0.159 | 2750 | 20 | 16.0/0 | 8736 | 820 | 10.65 | $900 | $9,589 | 8 | $1,199 |
| TOTALS | | | | | | | 45.96 | | $41,367 | 16 | $2,585 |

| DIFFERENTIAL/SAVINGS | | | | | | | 8.10 | | $7,291 | 16 | $456 |

FIG. 7

OPTIMIZATION OF VACUUM SYSTEM AND METHODS FOR DRYING DRILL CUTTINGS

FIELD OF THE INVENTION

The invention describes systems and methods for separating fluids from drill cuttings. Specifically, the invention relates to shakers that incorporate a vacuum system and methods of operating such systems to effect a high degree of fluid separation. The system and methods are effective across a variety of screen sizes, vacuum flows and vacuum designs.

BACKGROUND OF THE INVENTION

The loss of drilling fluids presents several technological and cost challenges to the energy exploration industry. These challenges generally include the seepage losses of drilling fluids to the formation, the recovery of drilling fluids at surface and/or the disposal of drilling detritus or cuttings that are contaminated with drilling fluid. In the context of this description, "drilling fluid" is both fluid prepared at surface used in an unaltered state for drilling as well as all fluids recovered from a well that may include various contaminants from the well including water and hydrocarbons.

As is known, and by way of background, during the excavation or drilling process, drilling fluid losses can reach levels approaching 300 cubic meters of lost drilling fluid over the course of a drilling program. With some drilling fluids having values in excess of $1600 per cubic meter, the loss of such volumes of fluids represents a substantial cost to drill operators. Drilling fluids are generally characterized as either "water-based" or "oil-based" drilling fluids that may include many expensive and specialized chemicals as known to those skilled in the art. As a result, it is desirable that minimal quantities of drilling fluids are lost during a drilling program with the result being that many technologies have been employed to minimize drilling fluid losses both downhole and at surface. Additionally, in some areas the delivery of oil or water for the formulation of drilling fluids can present several costly challenges for some operations; specifically desert, offshore and even some districts where communities will not allow allocation of water for this use.

As noted above, one particular problem is the separation of drilling fluid and any hydrocarbons from the formation that may be adhered to the drill cuttings (collectively "fluids") at the surface. The effective separation of various fluids from drill cuttings has been achieved by various technologies including but not limited to; hydrocyclones, mud cleaners, linear motion shakers, scroll centrifuges, vertical basket centrifuges (VBC), vacuum devices, and vortex separators. As known to those skilled in the art, these devices typically rent out at costs ranging from $1000 to $2000 per day and, as a result, can represent a significant cost to operators. Thus, the recovery of fluids necessary to recover these costs requires that the recovered fluid value is greater than the equipment rental cost in order for the recovery technology to be economically justified. On excavation projects where large amounts of high-cost drilling fluid are being lost (for example in excess of 3 cubic meters per day), then daily rental charges for specialized separation equipment can provide favorable economics. In addition, an operator will likely also factor in the environmental effects and/or costs of disposal of drilling fluid contaminated drill cuttings in designing their drilling fluids/drill cutting separation/recovery systems.

Further still, past techniques for separating drilling fluid from drill cuttings have also used liquid spraying systems to deliver "washing" liquids to drill cuttings as they are processed over shaker equipment. Such washing liquids and associated fluid supply systems are used to deliver various washing fluids as the cuttings are processed over a shaker and can include a wide variety of designs to deliver different washing fluids depending on the type of drilling fluid being processed. For example, washing liquids may be comprised of oil, water, or glycol depending on the drilling fluid and drill cuttings being processed over the shaker. Generally, these washing fluids are applied to reduce the viscosity and/or surface tension of the fluids adhered to the cuttings and allow for more fluids to be recovered. However, these techniques have generally been unable to be cost effective for many drilling fluids as the use of diluting fluids often produces unacceptable increases in drilling fluid volume and/or changes in chemical consistency and, hence, rheological properties of the drilling fluid.

Thus, while various separation systems are often effective and/or efficient in achieving a certain level of fluids/cuttings separations, each form of separation technology can generally only be efficiently operated within a certain range of conditions or parameters and at particular price points. For example, standard shakers utilizing screens are relatively efficient and consistent in removing a certain amount of drilling fluid from cuttings where, during the typical operation of a shaker, an operator will generally be able to effect drilling fluid/cuttings separation to a level of 12-40% by weight of fluids relative to the drill cuttings (i.e. 12-40% of the total mass of recovered cuttings is drilling fluid). The range of fluids/cuttings wt % is generally controlled by screen size wherein an operator can effect a higher degree of fluids/cuttings separation by using a larger screen opening (eg. 50-75 mesh) and a lower degree of fluids/cuttings separation with a smaller screen opening (eg. up to 325 mesh). The trade-off between using a large mesh screen vs. a small mesh screen is the effect of mesh screen size on the quantity of solids passing through the screen. That is, while an operator may be able to lower the fluids retained on cuttings coming off the shaker with a larger mesh screen (50-75 mesh), the problem with a larger mesh screen is that substantially greater quantities of solids will pass through the screen, that then significantly affect the rheology and density of the recovered fluids and/or require the use of an additional and potentially less efficient separation technology to remove those solids from the recovered drilling fluids. Conversely, using a small mesh screen, while potentially minimizing the need for further downstream separation techniques to remove solids from recovered drilling fluids, results in substantially larger volumes of drilling fluids not being recovered, as they are more likely to pass over the screens hence leading to increased drilling fluids losses and/or require subsequent processing.

Accordingly, in many operations an operator will condition fluid recovered from a shaker to additional processing with a centrifugal force type device in order to reduce the fluid density and remove as much of the fine solids as possible before re-cycling or re-claiming the drilling fluid. However, such conditioning requires more expensive equipment such as centrifuges, scrolling centrifuges, hydrocyclones, etc., which then contribute to the overall cost of recovery. These processing techniques are also directly affected by the quality of the fluid they are processing, so fluids pre-processed by shakers using coarse screen will not be as optimized as those received from finer screens.

Furthermore, the performance of centrifuges and hydrocyclones and other equipment are directly affected by the viscosity and density of the feed fluid. As a result, drilling fluid recovery techniques that send heavy, solids-laden fluids to secondary processing equipment require more aggressive techniques such as increased g-forces and/or vacuum to effect separation which will typically cause degradation in the drill cuttings.

Thus, the operator will try to balance the cost of drilling fluid losses with the quality of the fluid that is recovered together with other considerations. While operators will typically have little choice in the quality of the cuttings processing and fluid recovery techniques available, many operators will operate separation equipment such that the recovered drilling fluid density from the separation equipment will be about 200-300 kg/m$^3$ heavier than the density of the circulating fluid in the system. This heavier fluid which would contain significant quantities of fine solids and that when left in the drilling fluid will either immediately or over time impair the performance of the drilling fluid or any other type of fluid.

As a result, there continues to be a need for systems that economically increase the volume of fluids recovered from a shaker without negatively impacting the rheological properties of the recovered drilling fluid. More specifically, there has been a need for separation systems that result in recovered fluid densities in the range of 5-100 kg/m$^3$ relative to the original fluid density and that do not affect rheological properties such as plastic viscosity and gel strength.

In addition, there has been a need to develop a low-cost retrofit technology that can enhance fluid recovery and do so at a fractional cost level to mechanisms and technologies currently employed.

The use of vacuum technology has been one solution to improving the separation of drilling fluids. However, vacuum technology in itself presents various problems including insufficient cuttings/fluids separation that, as noted above, requires additional and expensive downstream processing, and its inability to effectively remove fines from the recovered drilling fluid which contributes to an increase in the density of the recovered drilling fluid. Moreover, aggressive vacuum systems will also degrade cuttings such that the problem of creating fines is increased.

In addition, various vacuum technologies may also present dust and mist problems in the workplace as, with past vacuum techniques, there is a need to regularly clean clogged screens with high pressure washes. High pressure washing of screens creates airborne dust and mist hazards to operators. Thus, there continues to be a need for technologies that minimize the requirement for screen washing.

Further still, there has been a need for improved fluid separation systems on the underside of a vacuum screen that allows relatively large volumes of air to be drawn through a vacuum screen to be effectively and efficiently separated from the relatively low volume of drilling fluid being drawn through a vacuum screen. That is, there has been a need for improved fluid/air separation systems. There has also been a need for vacuum technologies that assist in the oxidation of fatty acids within a drilling fluid that may reduce the need for additional emulsifiers.

Operationally, there has also been a need for improved methods of operating a vacuum system that effectively minimizes the risk of screen clogging but that also enables the use of finer screens.

Further still, there has been a need for systems that allow for the efficient replacement of screens but that also provide improved gaskets and sealing between the vacuum system and the screens.

A review of the prior art reveals that various technologies including vacuum technologies have been used in the past for separating drilling fluids from drill cuttings including vibratory shakers.

For example, U.S. Pat. No. 4,350,591 describes a drilling mud cleaning apparatus having an inclined travelling belt screen and degassing apparatus including a hood and blower. U.S. Patent Publication No. 2008/0078700 discloses a self-cleaning vibratory shaker having retro-fit spray nozzles for cleaning the screens. Canadian Patent Application No. 2,664,173 describes a shaker with a pressure differential system that applies a non-continuous pressure across the screen and other prior art including U.S. Pat. Nos. 6,092,390, 6,170,580, U.S. Patent Publication 2006/0113220 and PCT Publication No. 2005/054623 describe various separation technologies.

Thus, while past technologies may be effective to a certain degree in enabling drilling fluid/cuttings separation, the prior art is silent in aspects of the design and operation of separation devices that enable fluid removal to substantially improved levels. Specifically, the prior art is silent with respect to achieving fluids retained on cuttings level below about 12% by weight and that does not have an adverse effect on the density of recovered drilling fluid.

SUMMARY OF THE INVENTION

In accordance with the invention systems and methods for separating drilling fluid from drill cuttings improved vacuum systems are described.

In a first embodiment, an apparatus for improving the separation of drilling fluid from drill cuttings on a shaker is provided, the apparatus comprising: a shaker screen having an upper side and a lower side for supporting drilling fluid contaminated drill cuttings within a shaker; an air vacuum system operatively connected to a section of the shaker screen for pulling an effective volume of air through the section of the shaker screen to enhance the flow of drilling fluid through the section of the shaker screen and the separation of drilling fluid from drill cuttings; and, a drilling fluid collection system for collecting the separated drilling fluid from the underside of the screen and the air vacuum system; wherein the air vacuum system draws a volume of air through the screen that minimizes damage to the drill cuttings while enhancing the amount of drilling fluid removed from the drill cuttings and maintaining an effective flow of drill cuttings off the shaker.

In various embodiments, the invention provides additional functions and structures.

In one embodiment, the air vacuum system includes: a vacuum manifold for operative connection to a shaker and a section of the shaker screen; a vacuum hose operatively connected to the vacuum manifold and a vacuum pump operatively connected to the vacuum hose.

In another embodiment, the invention further includes a fluid/gas separation system operatively connected to the vacuum pump.

In another embodiment, the fluid/gas separation system is a multi-stage fluid separation system.

In another embodiment, the vacuum manifold has a funnel shaped portion for operative connection to a vacuum hose.

In yet another embodiment, the vacuum manifold is positioned adjacent the downstream end of the shaker screen.

In further embodiments, the vacuum manifold extends up to 75% of the total length of the shaker screen towards the upstream end, up to 33% of the total length of the shaker screen or up to 15% of the total length of the shaker screen. In one embodiment, the vacuum manifold is adapted for configuration to the shaker screen across 5-15% of the length of the shaker bed.

In yet further embodiments, the vacuum pump is adjustable to control the vacuum pressure and/or applies a pulsating vacuum pressure.

In another embodiment, the vacuum manifold includes a positioning system for altering the position of the vacuum manifold with respect to the shaker screen.

In yet another embodiment, the shaker screen includes a shaker frame and the shaker frame and associated shaking members are manufactured from composite materials.

In yet further embodiments, the shaker screen is 50-325 mesh or a combination thereof or 80-150 mesh or a combination thereof.

In one embodiment, the vacuum system pulls air through the screen at a velocity less than 8400 feet per minute.

In another embodiment, the air velocity through the screen is sufficient to produce a consistency in the drill cuttings exiting the shaker of semi-dry cement.

In another embodiment, the manifold includes a lip supporting a gasket and the screen operatively engages with the gasket and lip.

In further embodiments, the drilling fluids retained on cuttings is less than 12 wt %, less than 10 wt %, less than 8 wt % or less than 6 wt %.

In another embodiment, the system further comprises an air injection device for operative injection of a compressed gas into the drilling fluid for foaming the drilling fluid prior to drilling fluid contacting the shaker screen.

In another embodiment, the system further comprises a gas detector within the vacuum system for measuring the quantity and/or composition of gas released from the drilling fluid.

In another embodiment, the system further comprises at least one mass measurement system operatively connected to the shaker for measuring the relative mass of drill cuttings and fluid on the shaker.

In one embodiment, the mass measurement system includes at least two sensors positioned at different locations on the shaker bed and a display system for outputting the relative mass on the shaker at the different locations.

In another embodiment, the system further comprises a sparger operatively connected to the shaker for injecting gas into the drilling fluid before the drilling fluid is delivered to the shaker screen.

In one embodiment, the air vacuum system is designed for retro-fit connection to a shaker.

In another aspect, the invention provides a method of optimizing the performance of a drill cuttings shaker comprising the steps of: a) introducing drill cuttings contaminated with drilling fluid to an upstream end of a shaker bed having a shaker screen; and b) applying a vacuum force to the shaker screen sufficient to effectively reduce drilling fluid retained on cuttings to a level below that obtained when no vacuum force is applied.

In another embodiment, the invention also provides the step of recovering drilling fluid from the underside of the shaker screen and wherein the plastic viscosity of the drilling fluid is substantially equivalent to the plastic viscosity of an original drilling fluid prior to introduction into a well.

In various aspects of the method, the drilling fluids retained on cuttings after step b is less than 12 wt %, less than 10 wt %, less than 8 wt % or less than 6 wt %.

In another embodiments, the vacuum pressure is applied to up to 75% of the total length of the shaker screen, up to 33% of the total length of the shaker screen or to the downstream 5-15% of the shaker screen.

In another embodiment, the air flow is controlled to prevent stalling of drill cuttings on the screen.

In yet another embodiment, the air flow is sufficient to produce a consistency in the drill cuttings exiting the shaker of semi-dry cement.

In further embodiments, the air flow is less than 8400 feet per minute and/or the air flow is controlled to cause defoaming of a drilling fluid.

In one embodiment, the drilling fluid is foamed prior to contacting the shaker screen.

In one embodiment, the quantity and/or composition of gas recovered from the drilling fluid is measured within the vacuum system.

In yet another embodiment, the air flow through the vacuum screen is controlled to effect fatty acid oxidation within the drilling fluid.

BRIEF DESCRIPTION OF THE DRAWINGS

The invention is described by the following detailed description and drawings wherein:

FIG. 7 is a table showing a cost analysis of vacuum-processed drilling fluid as compared to a prior art processing method;

DETAILED DESCRIPTION OF THE INVENTION

In accordance with the invention and with reference to the figures, embodiments of an improved drilling fluid recovery method and apparatus are described.

Importantly, the systems and methods described enhance the separation of drilling fluids and drill cuttings therein providing an improvement in the removal or reduction of drilling fluids retained on cuttings values. In addition, the systems and methods can provide improved separations without significantly affecting the rheological properties of the drilling fluid.

Figure 2A:
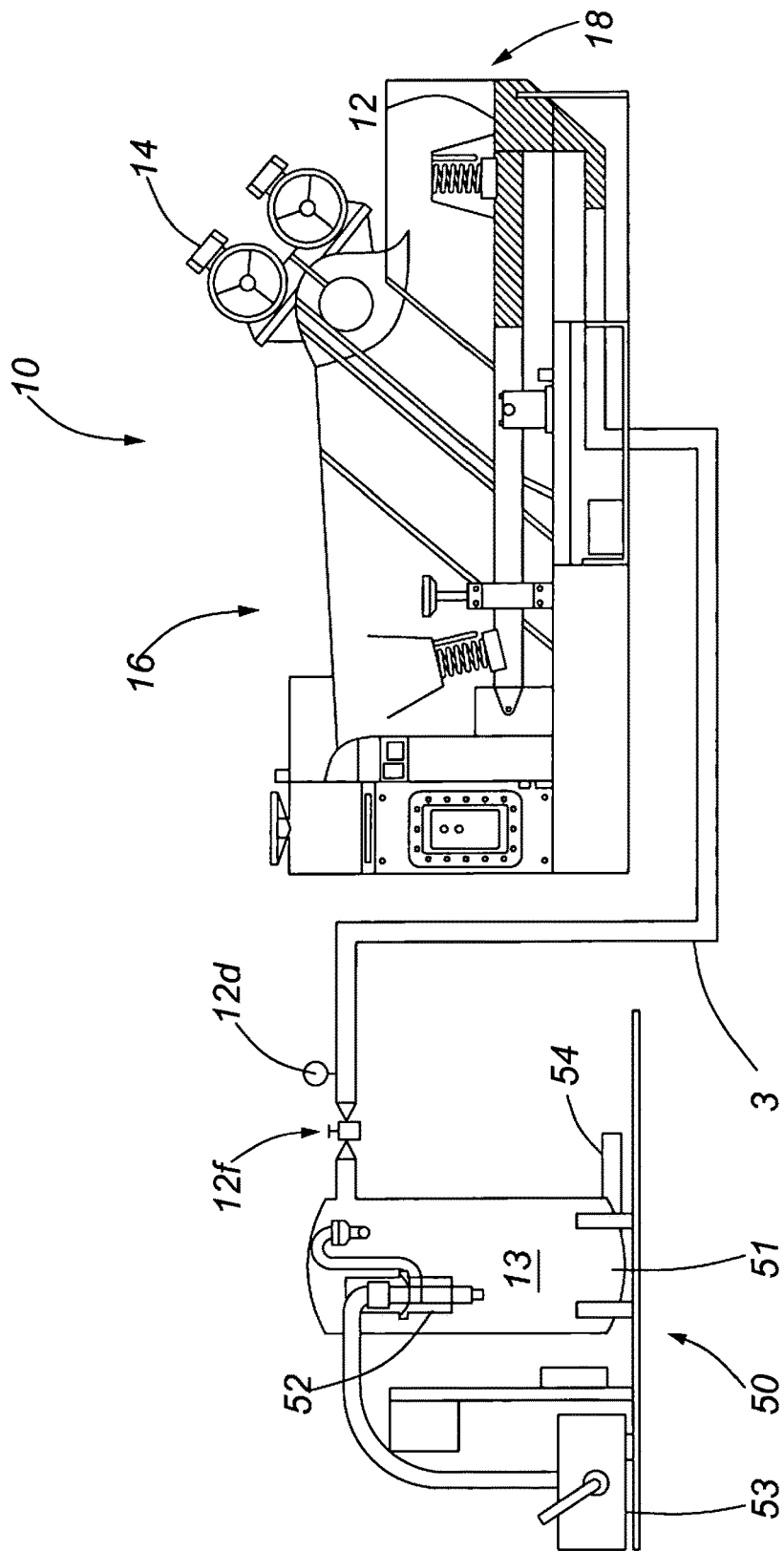
FIG. 2A is a side view of a shaker retrofit with the vacuum frame assembly and vacuum system in accordance with one embodiment of the invention.
Figure 2B:
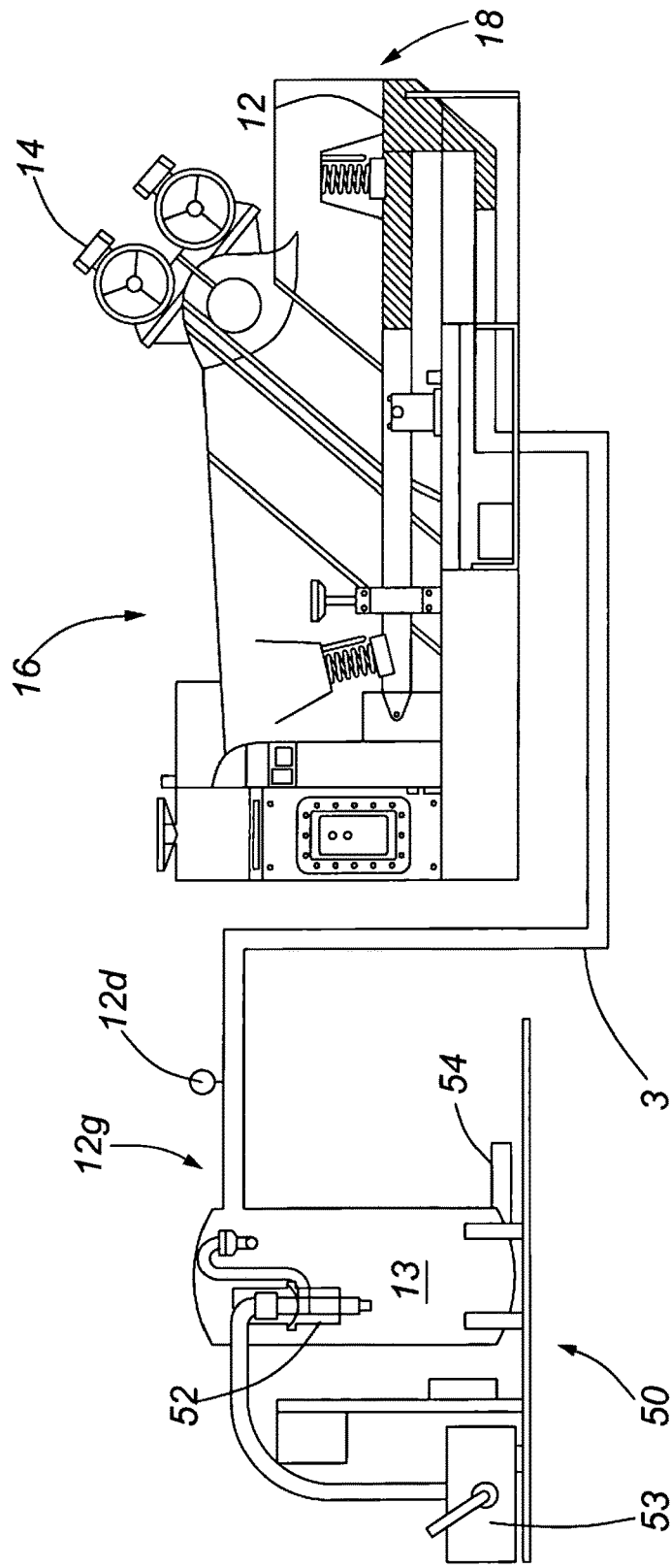
FIG. 2B is a side view of a shaker retrofit with the vacuum frame assembly and vacuum system in accordance with one embodiment of the invention.
Figure 4:
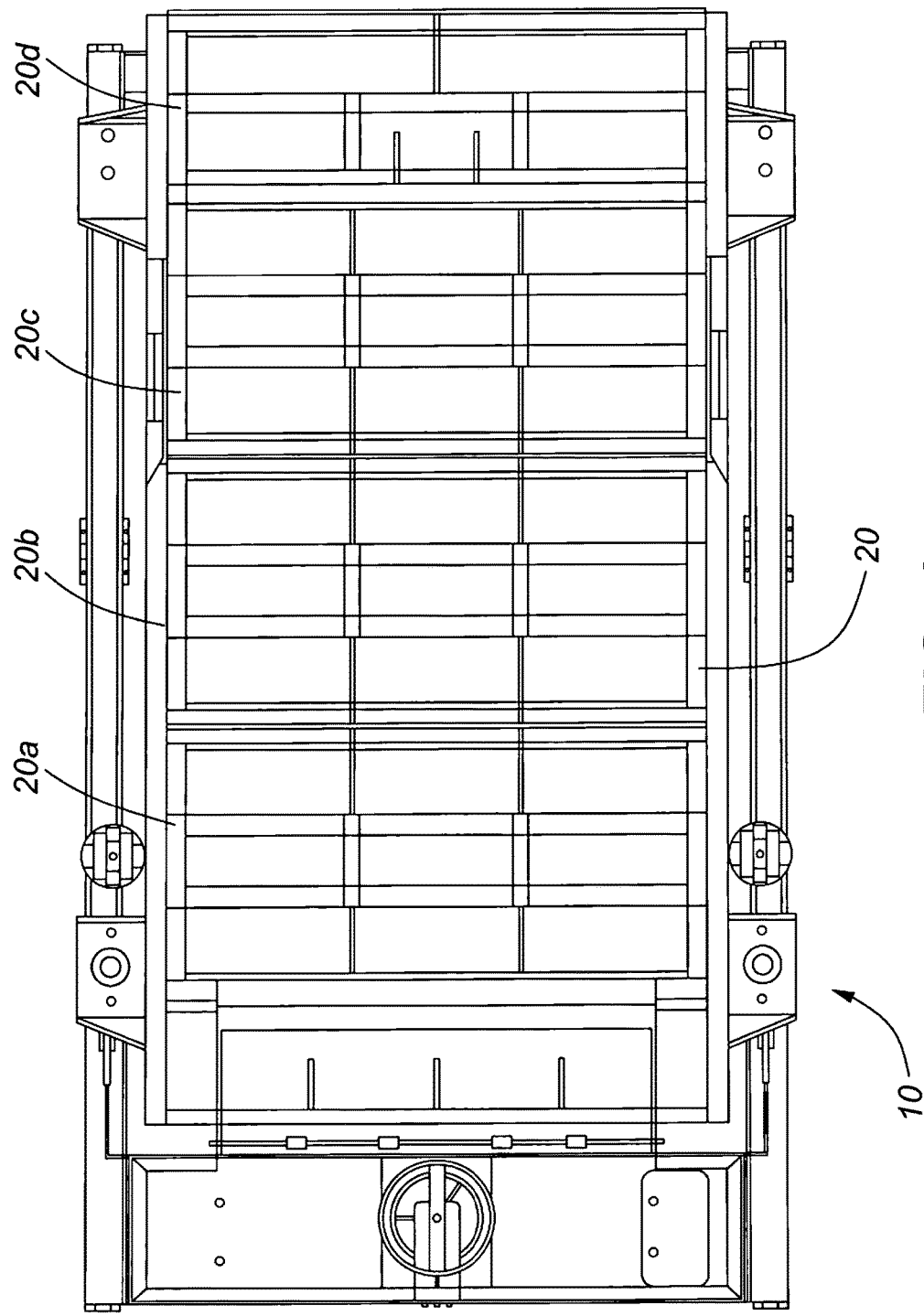
FIG. 4 is a plan view of typical shaker bed for retro-fit with a vacuum frame and manifold in accordance with one embodiment of the invention.

More specifically, the invention solves various technical problems of prior approaches to cleaning drill cuttings and recovering drilling fluids at the surface during drilling operations, and particularly problems in conjunction with known shaker systems. In addition, the invention describes methods of optimizing the separation of fluids from drill cuttings recovered at surface For the purposes of illustration, FIGS. 2A-2B and FIG. 4 show a known shaker 10 having a generally flat screen bed 12 comprised of multiple sections 20 over which recovered drilling fluid and drill cuttings are passed. The shaker 10 typically includes a dual motor shaking system 14 to impart mechanical shaking energy to the screen bed. Recovered drilling fluid and cuttings from a well are introduced to the upstream end of the screen bed 16 wherein the mixture of drilling fluid and cuttings move toward the downstream end 18 where the "dried" drill cuttings flow off the end of the shaker. The vibrating motion of the shaker and screen bed effects separation of the drill cuttings and fluids wherein the drilling fluid passes through the screen bed and is recovered from the underside of the shaker 10 and drill cuttings are recovered from the downstream end 18 of the screen bed. In addition to effects of gravity in promoting the separation of drill fluid/drill cuttings, the vibrating motion of the screen bed imparts mechanical energy to the drill cutting particles to "shake-loose" fluids that may be adhered to the outer surfaces of the drill cuttings by surface tension. Upon separation, drilling fluids will flow by gravity, atmospheric pressure, hydrostatic pressure of the fluid on the screen or a combination of all three through the screen where they are collected. As is known, this style of shaker and others are typically able to separate drilling fluid from drill cuttings from an initial drilling fluids/cuttings value in excess of 100 wt % to a level of about 40-15 wt %.

Figure 1:
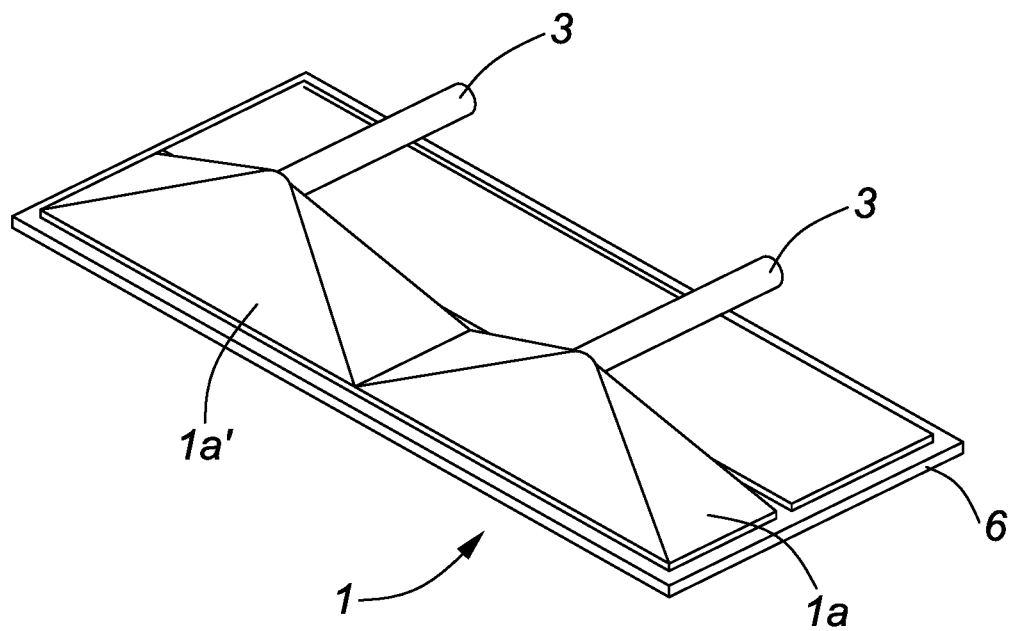
FIG. 1 is a perspective view of a bottom perspective view of a vacuum frame assembly and manifold in accordance with one embodiment of the invention.
Figure 1A:
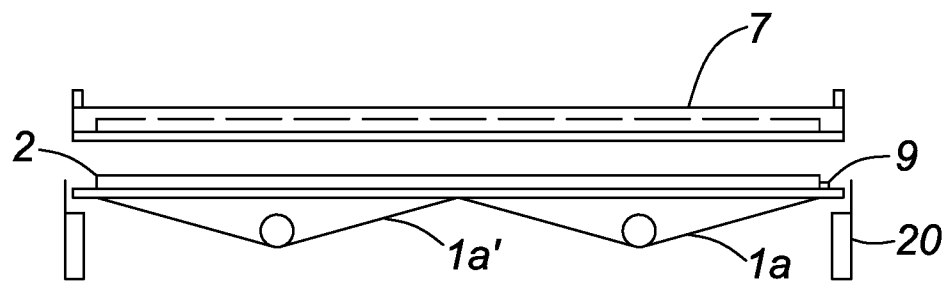
FIG. 1A is an exploded end view of a screen, vacuum frame assembly and manifold in accordance with one embodiment of the invention.
Figure 1B:
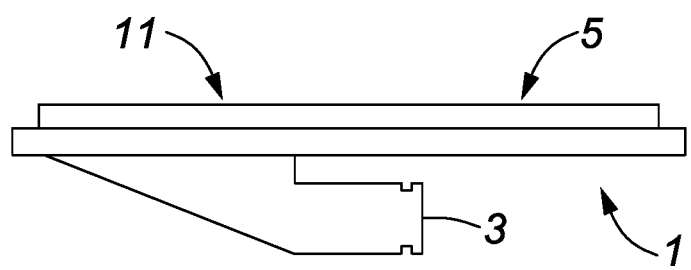
FIG. 1B is a side view of a vacuum frame assembly and manifold in accordance with one embodiment of the invention.
Figure 1C:
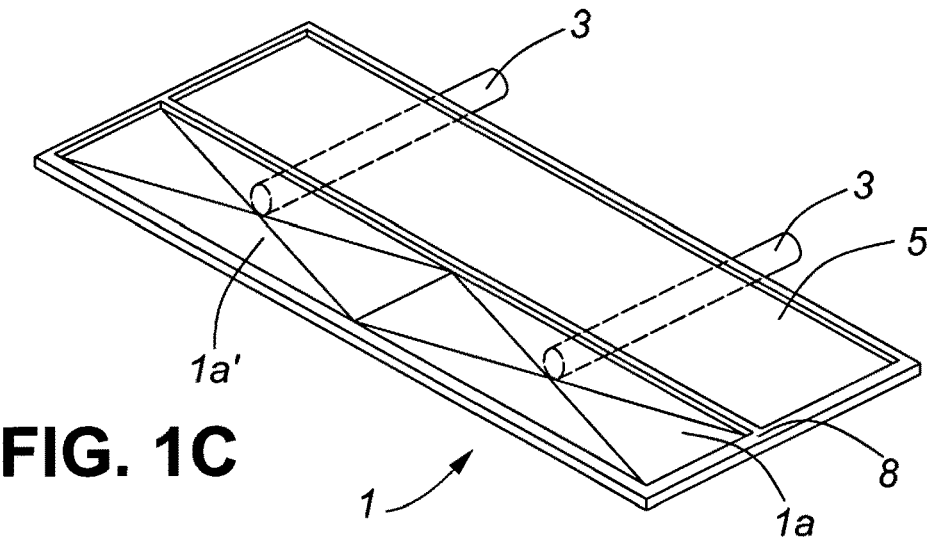
FIG. 1C is a top perspective of a vacuum frame assembly and manifold in accordance with one embodiment of the invention.
Figure 1D:
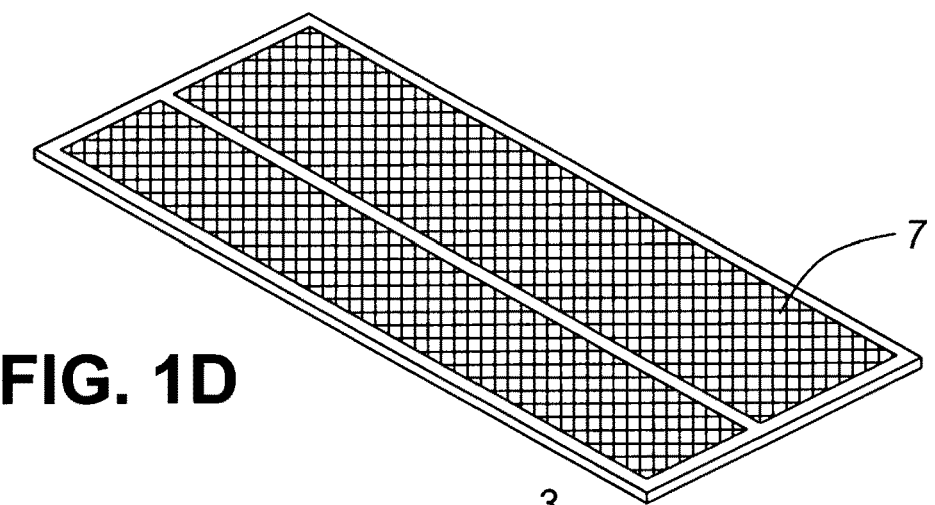
FIG. 1D is a perspective view of a screen assembly in accordance with one embodiment of the invention.
Figure 1E:
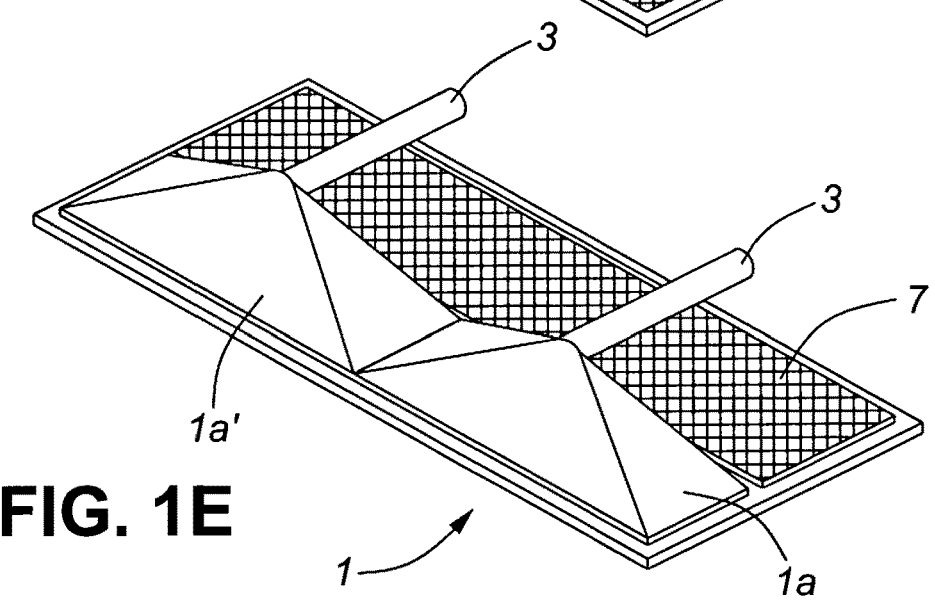
FIG. 1E is a perspective bottom view of a vacuum frame assembly and screen in accordance with one embodiment of the invention.
Figure 6:
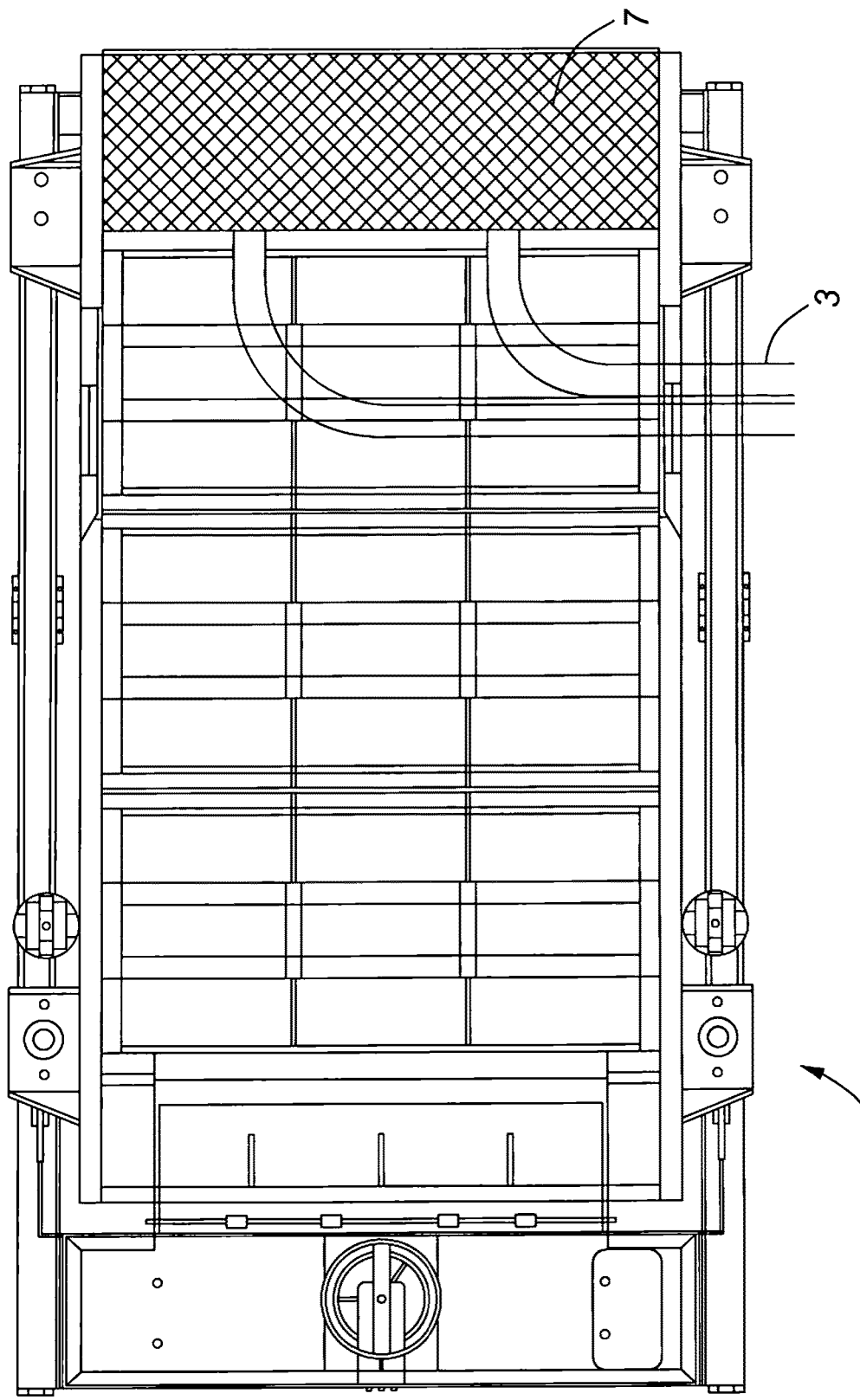
FIG. 6 is a plan view of typical shaker bed retro-fit with a vacuum frame and manifold and screen in accordance with one embodiment of the invention.

As shown in FIGS. 2A-2B, and in accordance with the invention, the shaker is provided with a vacuum system 50 located below the screen bed 12 to enhance the separation of drilling fluids from drill cuttings and the flow of drilling fluid through the screen. As best shown in FIGS. 1-1E and 6, a screen 7 is provided with at least one vacuum manifold 1, 1a, 1a' for applying a vacuum pressure to the underside of a portion of the screen 7 and shaker bed 12. That is, the vacuum manifold is designed to connect to the underside of a screen in order that as cuttings and fluids pass over the screen, a vacuum pressure gently encourages the passage of drilling fluid through the screen and/or to effectively break the surface tension of fluids adhering to the drill cuttings and/or screen, hence improving the efficiency of separation and realizing lower drilling fluid retained on cuttings levels. It is also preferred that the vacuum manifold is tapered and/or curved to facilitate the flow of vacuumed materials away from the screen and otherwise over time, minimize the risk of solids collecting or depositing within the system.

As shown in FIGS. 1-1E and 2A-3B, the horizontal length of the vacuum manifold is designed to apply a vacuum across a relatively small area of the total area of the screen bed 12 and at the downstream end of the screen. These figures show a vacuum area extending across the full horizontal width of the screen bed and in a typical shaker approximately 7 inches of the total length of the screen bed 12. This amount is preferably about 5-15% of the total length of the screen bed. In one embodiment, the vacuum manifold extends up to 33% of the total length of the shaker screen, as shown by the dotted lines 22 in FIG. 5, which represent a length that is 33% of the total length of the shaker screen.

The use of a relatively small area of the total screen bed area is preferred in order to delineate between different separation mechanisms. That is, it is preferred that at the upstream end of the shaker, mechanical separation mechanisms are utilized to provide primary separation whereas at the downstream end the vacuum is applied to provide secondary separation (in addition to shaking). This physical separation of the shaking and vacuum separation techniques maximizes the effectiveness of both separation techniques without the detrimental effects of cuttings degradation and any downstream effects that cuttings degradation and/or passage through the screen would have on drilling fluid rheology such as plastic viscosity inter alia. As explained in greater detail below, maintaining a film of drilling fluid prior to final vacuum treatment minimizes the abrasive and destructive effects of drill cuttings abrading one another.

Also as shown in FIG. 1 for example, although not essential, separate vacuum manifolds 1a and 1a' are utilized across the width of the screen to ensure that a relatively even and controllable amount of vacuum pressure can be applied across the screen.

Figure 3A:
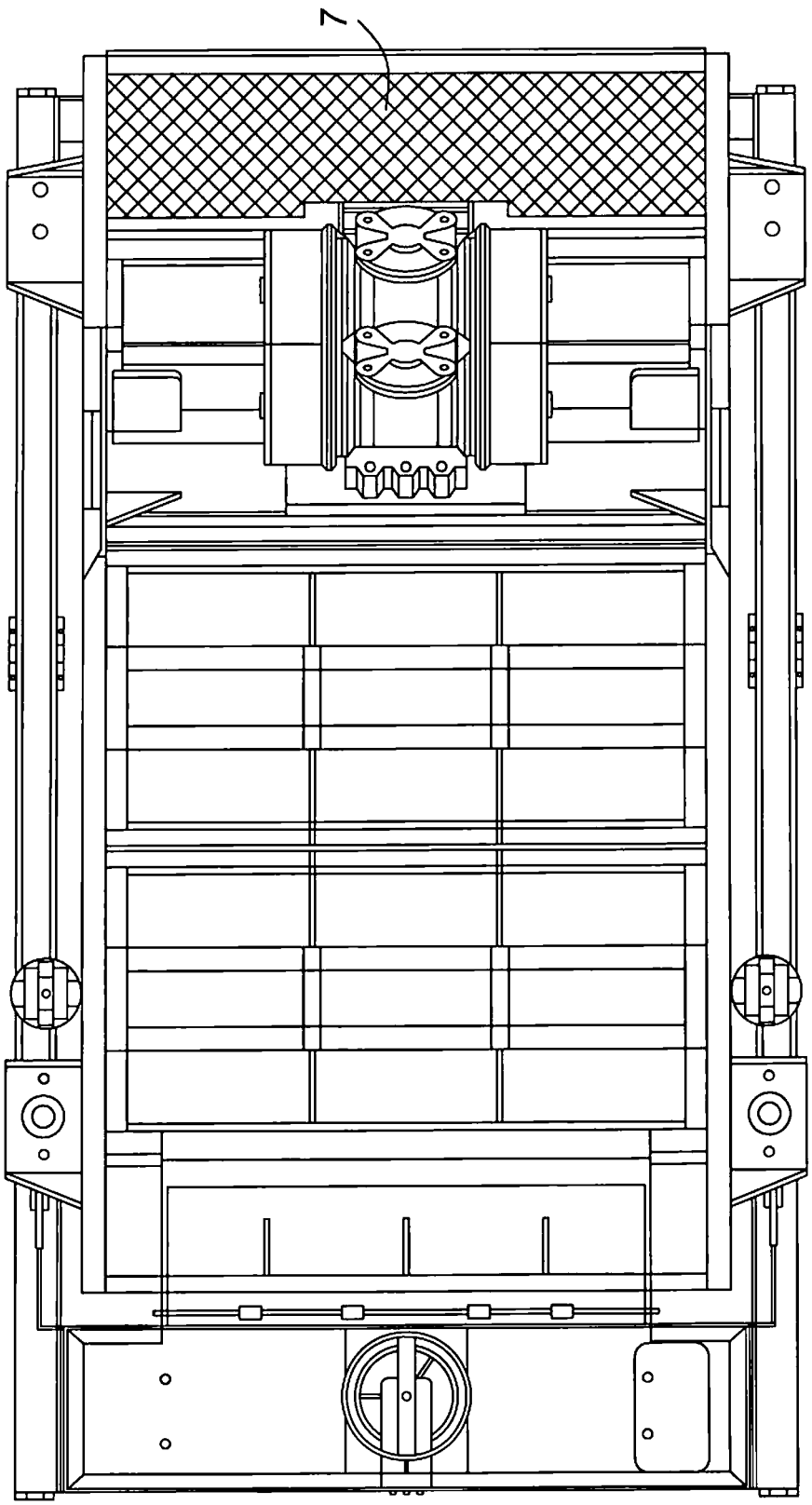
FIG. 3A is a top view of a shaker retro-fit with a screen and vacuum system in accordance with one embodiment of the invention.
Figure 3B:
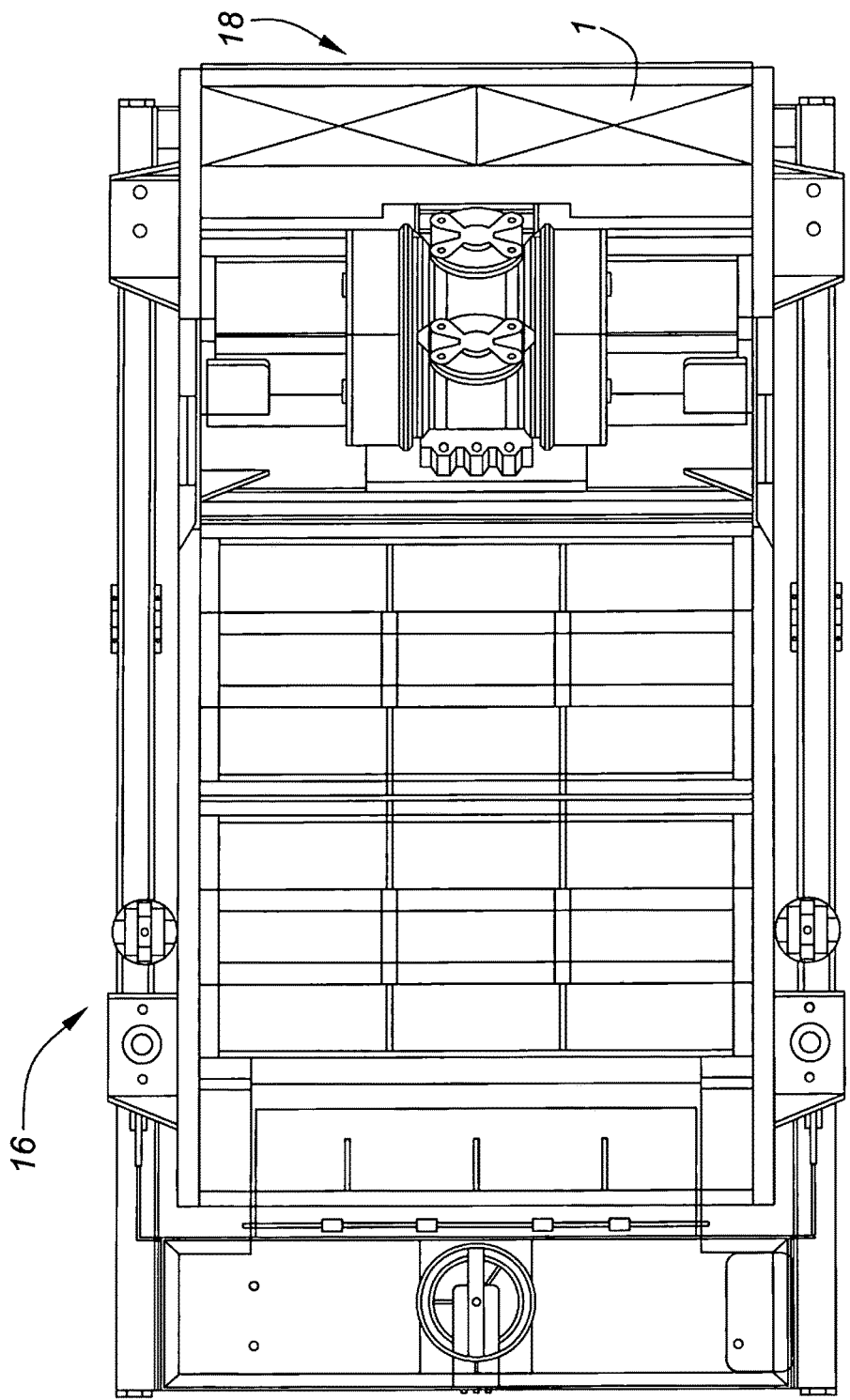
FIG. 3B is a top view of a shaker retro-fit with a vacuum system in accordance with one embodiment of the invention.
Figure 3C:
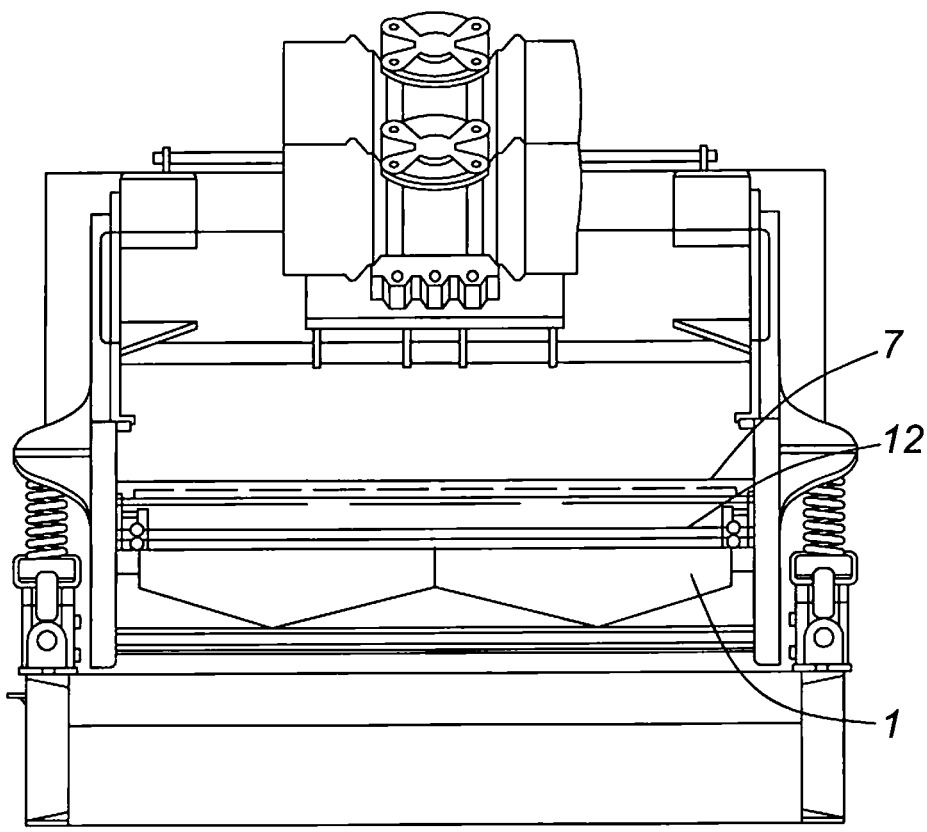
FIG. 3C is a front view of a shaker retro-fit with a screen and vacuum system in accordance with one embodiment of the invention.
Figure 3D:
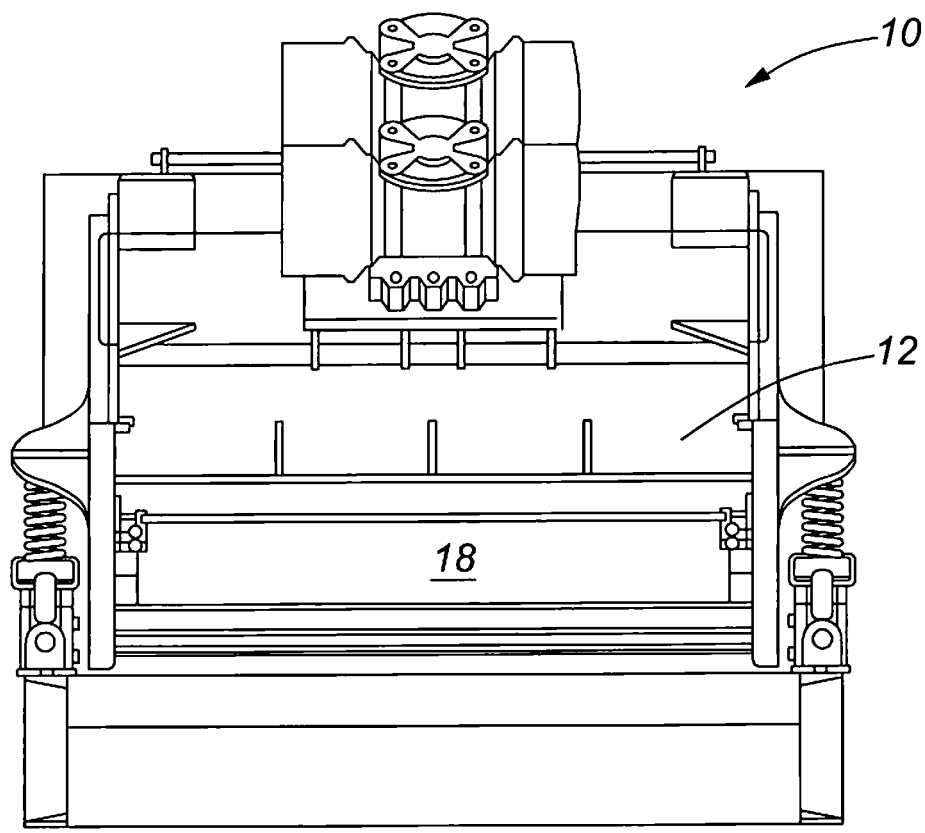
FIG. 3D is a front view of a shaker for retro-fitting in accordance with one embodiment of the invention.

As shown in FIGS. 1B, 1E, 3A and 3C, seiving screen(s) 7 is/are operatively attached to a vacuum frame and manifold 1 with a fluid conveyance tube/vacuum tube 3 to a vacuum system 50 with a vacuum gauge 12d and a fixed vacuum device 12f (FIG. 3A) or variable vacuum device 12g (FIG. 3B). Both embodiments have a fluid separation and collection system 13 that allows recovered drilling fluid to be separated from the vacuum system to a storage tank for re-use.

FIGS. 2A and 2B show a preferred embodiment of a fluid separation system 13 having multi-stage fluid/solids separation. In this system, a primary accumulator tank 51 enables first-stage fluid/gas separation. A secondary accumulator 52 in series with the primary accumulator provides secondary fluid/gas separation. Each stage includes appropriate fluid level detection systems and valves to ensure system shutdown in the event that accumulated fluid levels become too high. The fluid separation system 13 is configured to the vacuum frame and manifold 1 and to a vacuum compressor 53. Drilling fluids may be recovered from the bottom of the accumulator tank 51 by port 54.

As shown in FIGS. 2A and 2B, the vacuum adjustment system can be a restrictive orifice 12f or a controlled air/atmospheric leak into the vacuum line 12g as known to those skilled in the art. A restrictive orifice constricts flow and leads to a build up in the vacuum line, while a controlled atmospheric leak does not restrict flow. The vacuum gauge 12d is useful for tuning but is not absolutely necessary.

Vacuum to Screen Interface and Screen Design

Figure 5:
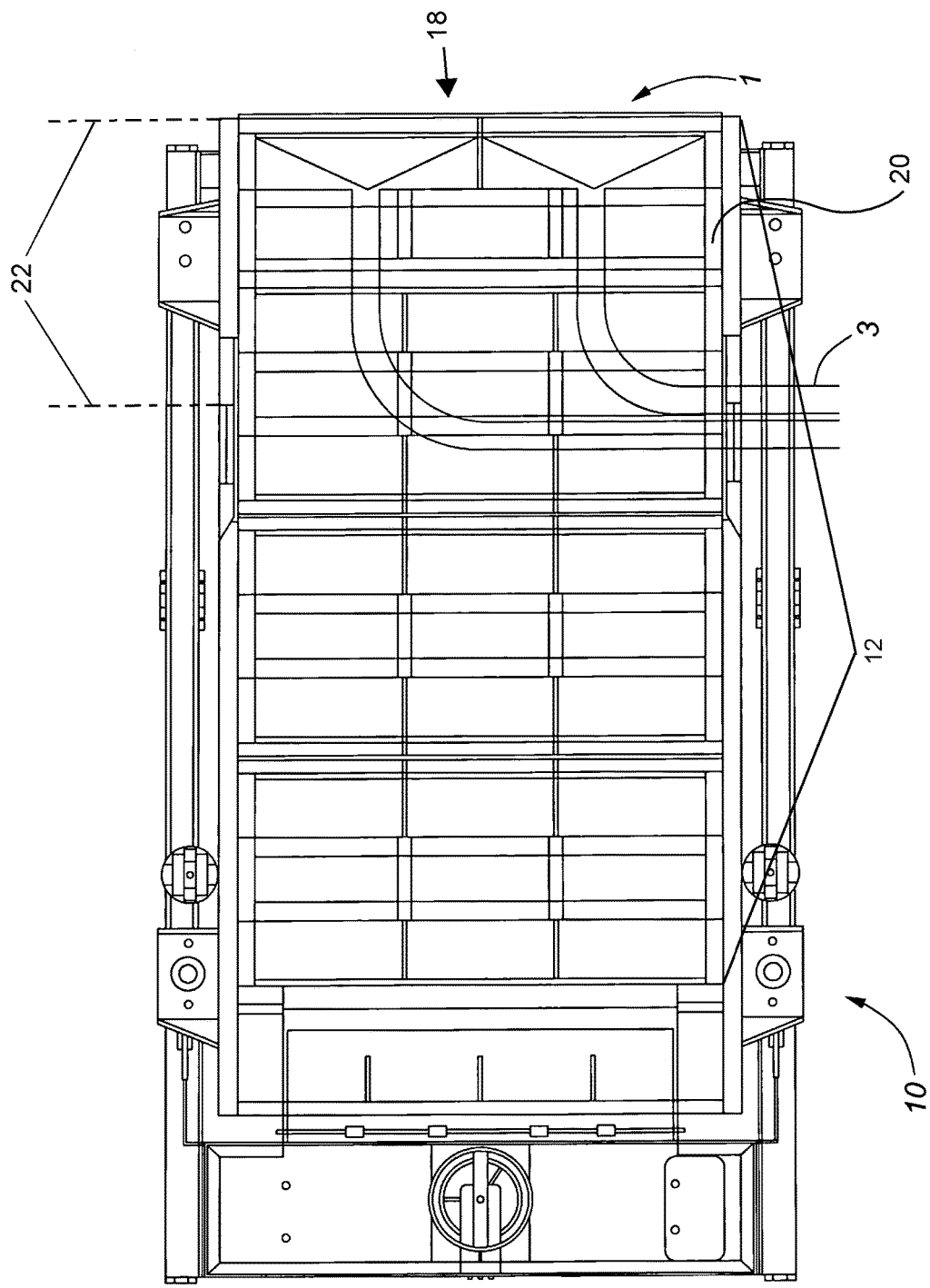
FIG. 5 is a plan view of typical shaker bed retro-fit with a vacuum frame and manifold showing vacuum conduits leading away from the shaker bed in accordance with one embodiment of the invention.

As shown in FIGS. 1-1E, at least one vacuum manifold 1a, 1a', is adapted for configuration and sealing to a screen 7 by a vacuum manifold support frame 6 (collectively vacuum frame and manifold 1). The vacuum manifold support frame 6 may include a bisecting bar 8 defining a vacuum area 11 and open area 5. Each vacuum manifold 1a, 1a' has a generally funnel-shaped design allowing fluids passing through the screen to be directed to at least one vacuum hose connection 3. As shown in FIG. 1A, the upper edge of the vacuum manifold includes an appropriate connection system and sealing system for attachment to the screen 7 such as a mating lip 2 and sealing gasket 9. As shown schematically in FIG. 1A, the vacuum frame and manifold is installed above over support rails 20 of the shaker basket and the screen 7 is connected to the upper side of the vacuum screen and manifold. A clamping system secures each of the support rails, vacuum screen and manifold and screen together. The retro-fit assembly of the vacuum frame and manifold and screen to a shaker is best shown in FIGS. 4-6. FIG. 4 shows a plan view of a typical shaker and shaker bed in which the shaking motors have been removed for clarity. The shaker bed includes a plurality of separate sections of support members (20a, b, c, d) onto which a screen 7 is normally mounted. The sections may be positioned at the same height or different heights as known to those skilled in the art. Generally, if the sections are at different heights, one or more upstream sections may be higher than one or more downstream sections.

As shown in FIGS. 1A and 5, the vacuum frame and manifold is placed on top of the support members and a screen is placed on top such that the vacuum frame and manifold mates with the underside of the screen (FIGS. 1A and 6). A clamping system such as pressure wedges secures the vacuum screen (change to frame) and manifold and screen to the support members. Vacuum hoses are connected to the manifold at ports 3 by an appropriate connection system and run to the exterior of the shaker where they are connected to the vacuum and separation system 50.

In addition, the vacuum manifold and frame is provided with a seal 9 around the four edges to ensure effective connection between the frame and manifold and prevent leakage of fluids. The seal 9 is preferably a solvent-resistant gasket such as Viton™ or nitrile rubber.

It is also preferred that a screen can be removed from the vacuum frame 6 without requiring removal of the vacuum manifold and frame from the support rails 20.

EXAMPLES

A first trial of the system was made during a drilling operation at Nabors 49, a drilling rig in the Rocky Mountains of Canada. The trial was conducted while the rig was drilling and an oil-based invert emulsion drilling fluid was used. The well particulars and drilling fluid properties used during drilling are shown in Table 1 and are representative of a typical well and drilling fluid.

TABLE 1

| Drilling Fluid Properties | |
|---|---|
| Depth | 4051 m |
| T.V. Depth | 3762 m |
| Density | 1250 kg/m$^3$ |
| Gradient | 12.3 kPa/m |
| Hydrostatic | 46132 kPa |
| Funnel Viscosity | 45 s/l |
| Plastic Viscosity | 10 Mpa.s |
| Yield Point | 2 Pa |
| Gel Strength | 1/1.5 Pa 10 s/10 min |
| Oil/Water Ratio | 90:10 |
| HTHP | 16 ml |
| Cake | 1 mm |
| Chlorides | 375714 mg/l |
| Sand Cont | trace |
| Solids Cont | 12.88% |
| High Density | 402 kg/m$^3$ (9.46 wt %) |
| Low Density | 89 kg/m$^3$ (3.42%) |
| Flowline | 42° C. |
| Excess Lime | 22 kg/m$^3$ |
| Water Activity | 0.47 |
| Electric Stability | 396 volts |
| Oil Density | 820 kg/m$^3$ |

The vacuum test was conducted on a MI-Swaco Mongoose Shaker.

For the first test, only one side of the vacuum system was connected so that representative samples could be collected from both sides of the screen to give a quantitative and qualitative assessment of the effect of vacuum on separation.

The vacuum system included a Westech S/N 176005 Model:Hibon vtb 820 vacuum unit (max. 1400 CFM). The vacuum unit was pulling at 23 in. Hg. through a 22 inch×1 inch vacuum manifold during the test. An 84 mesh screen (i.e. open area of 50% such that the actual flow area through the screen was 0.07625 ft$^2$). During operation, the cuttings stream transited this vacuum gap in about 3 seconds.

Samples were collected during the test and there was a visible difference between those processed over the vacuum bar and those which passed through the section without being subjected to a vacuum.

Qualitatively, the vacuum-processed cuttings were more granular and dryer (similar in consistency to semi-dry cement) whereas the un-processed cuttings (i.e. no vacuum) had a slurry-like texture typical of high oil concentration cuttings.

The recovered test samples were then distilled (50 ml sample) using a standard oil field retort. The field retort analysis is summarized in Table 2.

TABLE 2

Trial Test Results-Field Retort

| Test | Sample (g) | Oil (ml) | Water (ml) | Oil g/cc | Oil (g) | Oil % | Water % | Recovered Oil wt %/ wt % of Cuttings | Recovered Oil vol %/ vol % of Cuttings |
|---|---|---|---|---|---|---|---|---|---|
| Vacuum | 90 | 14.5 | 2.0 | 0.82 | 11.9 | 88 | 12 | 13.18 | 29.00 |
| No vacuum | 97 | 18.9 | 2.1 | 0.82 | 15.5 | 90 | 10 | 15.99 | 37.80 |

These results show a significant effect in about 3 seconds of exposure of vacuum. In particular, test 1 showed that vacuum resulted in an approximately 8 volume % improvement in oil recovery from the vacuumed cuttings.

During this trial, it was observed that excessive and/or an invariable vacuum pressure and airflow rate on the 1 inch screen could cause the vacuum screen to overcome screen vibration and to stall the cuttings on the screen thereby preventing effective discharge of cuttings from the shaker. As a result, the vacuum system and screen design as shown in FIG. 5 where the vacuum is applied over approximately 7-10 inches (typically about 5-15% of the screen length) is preferred as greater control on the vacuum pressure can be effected. Importantly, in order to minimize damage to the cuttings as they transition the screen, the position of the vacuum should be such that the drilling fluid cushion between drill cuttings and the screen is minimal at the point that the cuttings engage the vacuum and that "dried" cuttings that do not have the drilling fluid cushion do not engage with the screen for a significant period of time so as to cause damage to the cuttings and create fines that may then transition the screen.

In addition, a pulsating or constant variable flow in vacuum pressure may be utilized as a means of effectively stripping drilling fluid from drill cuttings. The operating frequency of such pulsations and/or the degree of pulse pressure variation can be varied to prevent accumulated freezing of cuttings on the screen while also minimizing the time that dry cuttings are in contact with the screen.

Further still, as is known, drilling fluids upon delivery to a shaker are often foamed as a result of dissolved gases within the drilling fluid expanding at surface which causes the drilling fluid to foam.

Figure 12:
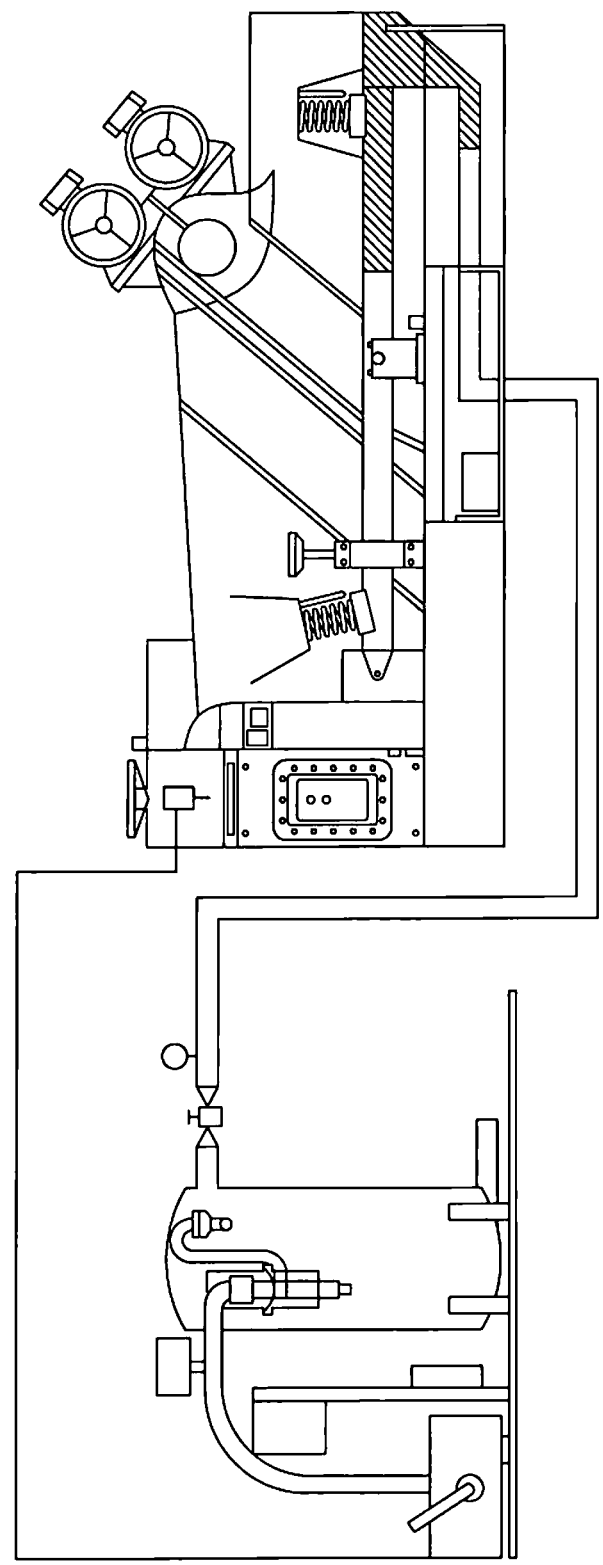
FIG. 12 is a schematic diagram of a further embodiment having a gas injection system in accordance with one embodiment of the invention; and, FIG. 13 is a graph comparing primary and secondary emulsifier usage in wells using roto-vac and vacuum screen technologies.

In the past, these foamed drilling fluids have decreased the performance of the shaker that, depending on the severity of the foaming, may require the addition of anti-foaming agents to enable effective drilling fluid separation using a shaker. In accordance with the invention, the use of a vacuum not only de-foams the drilling fluid, it has been observed that a foamed drilling fluid subjected to vacuum will also have improved drilling fluid/drill cuttings separation wherein a foamed drilling fluid can result in a 1 wt % decrease in the drilling fluids retained on cuttings value. As a result, in one embodiment, the invention provides an effective method of de-foaming a drilling fluid as a result of the shaker/vacuum process. In addition, a drilling fluid may also be subjected to a pre-foaming treatment with a compressed gas in order to improve the subsequent shaker/vacuum process. Pre-foaming can be achieved in various ways including but not limited to positioning a sparger 100 (with a gas injection system) in the fluid flow prior to the fluid passing over the shaker (FIG. 12). In addition, the action of the vacuum also provides a degassing capability that can act as an early warning system in the event that significant quantities of dangerous gases are contained in the drilling fluid. As explained in greater detail below, the use of one or more gas sensors 101 beneath the screens can signal a significant quantity of gas which can be the trigger to utilize de-gassing equipment.

Cost Analysis

FIG. 7 shows an analysis of representative cost benefits realized by use of the separation system in accordance with the invention. As shown, drilling fluid volumes and drill cutting volumes are calculated based on a particular length of boreholes and borehole diameters.

FIG. 7 shows that over a representative 8 day drilling program, with only a 3 wt % improvement in drilling fluid retained on cuttings, $7291 in fluid costs would be saved based on the recovery of drilling fluid having a value of $900 per cubic meter.

As described below, these are conservative numbers as greater than 3 wt % improvements can be achieved and with drilling fluids of considerably higher value. For example, and in another scenario, if 2.4+ cubic metres of drilling fluid per day is recovered from a typical installation having a fluid value of $1650/m$^3$, the cost savings could be at least $4000/day.

In comparison to a prior art or conventional separation system where such prior art cuttings processing equipment require mobilization and demobilization costs as well as costing $1500-$2000 per day for rental fees, conventional cuttings equipment is not cost effective as a means of effectively reducing the overall costs of a drilling program. However, the system in accordance with the invention can be deployed at a significantly lower daily cost and hence allows the operator to achieve a net back savings on the fluid recovery.

Other Field Trials

Further field trials were conducted with results shown in Table 3.

TABLE 3

Field Trials with Varying Screen Sizes and Vacuum Rates

| Run | Screen Mesh (Mesh #) | Screen Open Area (%) | Vacuum Pump Flow Rate (ft³/min) | Vacuum Manifold Dimensions Width (in) | Vacuum Manifold Dimensions Length (in) | Vacuum (in Hg) | Vacuum Flow Open Area (ft²) | Calculated Air Velocity (fpm) | Oil on Cuttings (% wt) | Observations |
|---|---|---|---|---|---|---|---|---|---|---|
| 1 | 84 | 49.80 | 1400 | 0.17 | 2 | 23 | 0.17 | 8434 | 7 | Cuttings "frozen" |
| 2 | 84 | 47.90 | 400 | 0.17 | 4 | 21 | 0.32 | 1253 | 8 | Operational |
| 3 | 84 | 49.80 | 400 | 0.50 | 4 | 16 | 1.00 | 402 | 8.5 | Operational |
| 4 | 84 | 47.90 | 0 | 0.50 | 4 | 0 | 1.92 | 0 | 19 | No Vacuum |
| 5 | 84 | 49.80 | 400 | 0.50 | 4 | 7 | 1.99 | 201 | 9 | Operational |
| 6 | 105 | 46.90 | 400 | 0.50 | 4 | 7 | 1.88 | 213 | 8 | Operational |
| 7 | 130 | 47.00 | 400 | 0.50 | 4 | 7 | 1.88 | 213 | 7.6 | Operational |
| 8 | 145 | 46.40 | 400 | 0.50 | 4 | 7 | 1.86 | 216 | 7.2 | Operational |
| 9 | 130 | 47.00 | 400 | 0.50 | 4 | 7 | 1.86 | 216 | 6.2 | Operational |
| 10 | 130 | 47.00 | 400 | 0.50 | 4 | 7 | 1.86 | 216 | 5.8 | Operational |
| 11 | 130 | 47.00 | 400 | 0.50 | 4 | 7 | 1.86 | 216 | 5.6 | Operational |

The data presented shows the effect of different vacuum flow rates, manifold dimensions, vacuum gauge pressures, calculated air velocities and measured drilling fluids retained on cuttings values. The runs included screen mesh sizes of 84, 105, 130 or 145 mesh. In each case, the vacuum pump was operated at a flow rate of 400 cfm with the exception of Run 1 where a very high flow rate was used and Run 4 which shows results when no vacuum was applied. For each run and for each manifold dimension, the observed vacuum gauge pressure was recorded and ranged from 7 inches of Hg to 23 inches of Hg. The maximum gauge pressure that the vacuum pump was capable of pulling was 27 inches of Hg if the vacuum ports were completed closed off. Based on the manifold size and the vacuum pump flow rate, a calculated air velocity was determined. Thus, the calculated air velocity for Run 1 where the open manifold area was 0.17 ft² was approximately 8400 feet per minute.

Run 1 shows the results of a high calculated air velocity through the screen. This flow rate resulted in the cuttings "freezing" on the screen that then caused the cuttings to build up at that area. This required that the shaker be stopped after a few minutes of operation to scrape off the vacuumed area of cuttings. The results show that this high air velocity was effective in removing fluid from cuttings (i.e. 7 wt % fluid retained on cuttings) but from an operational perspective was ineffective due to the requirement to manually clear cuttings.

Runs 2 and 3 shows the effect of increasing the manifold area with a corresponding decrease in air velocity. In each of these cases, the system was operational in that cuttings did not freeze on the screen and thus permitted continuous operation.

Run 4 shows the baseline value of a shaker without the vacuum turned on. In this case, the drilling fluid retained on cuttings was 19 wt %.

Runs 5-11 show the effect of varying screen mesh size and the effect on drilling fluid retained on cuttings. As shown, each of these runs was operational and resulted in substantially lower drilling fluid retained on cuttings values. Importantly, it is noted that a finer screen (eg. 130 mesh) showed drilling fluid retained on cuttings as low as 5.6 wt %.

From an operational perspective, with drilling fluid retained on cuttings values in the range of 5-9 wt %, the recovered cuttings had the appearance and consistency of semi-dry cement.

Table 4 shows further details of the properties of various samples recovered from the surface of a 130 mesh screen and the material balance for use in calculating wt % and vol % of drilling fluid retained on cuttings values.

TABLE 4

Representative Values of Recovered Samples over 130 Mesh Screen

| Screen Mesh # | Oil Density (kg/m³) | ASG Solids (kg/m³) (recovered above screen) | Retort (50 mls) (after distillation) Oil (mls) | Retort (50 mls) (after distillation) Water (mls) | Retort (50 mls) (after distillation) Solids (mls) | High Density concentration kg/m³ | High Density concentration % | Low Density concentration kg/m³ | Low Density concentration % | Oil on Cuttings % wt | Oil on Cuttings % vol |
|---|---|---|---|---|---|---|---|---|---|---|---|
| 130 | 818 | 2751 | 11.0 | 2.0 | 37.0 | 33.0 | 0.80 | 284.0 | 10.72 | 8.7 | 22.0 |
| 130 | 818 | 2751 | 8.5 | 2.0 | 39.5 | 33.0 | 0.80 | 284.0 | 10.72 | 6.3 | 17.0 |
| 130 | 818 | 2706 | 8.0 | 2.0 | 40.0 | 13.0 | 0.32 | 208.0 | 7.85 | 5.9 | 16.0 |
| 130 | 818 | 2706 | 8.5 | 2.0 | 39.5 | 13.0 | 0.32 | 208.0 | 7.85 | 6.4 | 17.0 |
| 130 | 818 | 2662 | 7.5 | 2.0 | 40.5 | 2.0 | 0.05 | 149.0 | 5.62 | 5.6 | 15.0 |

Figure 8:
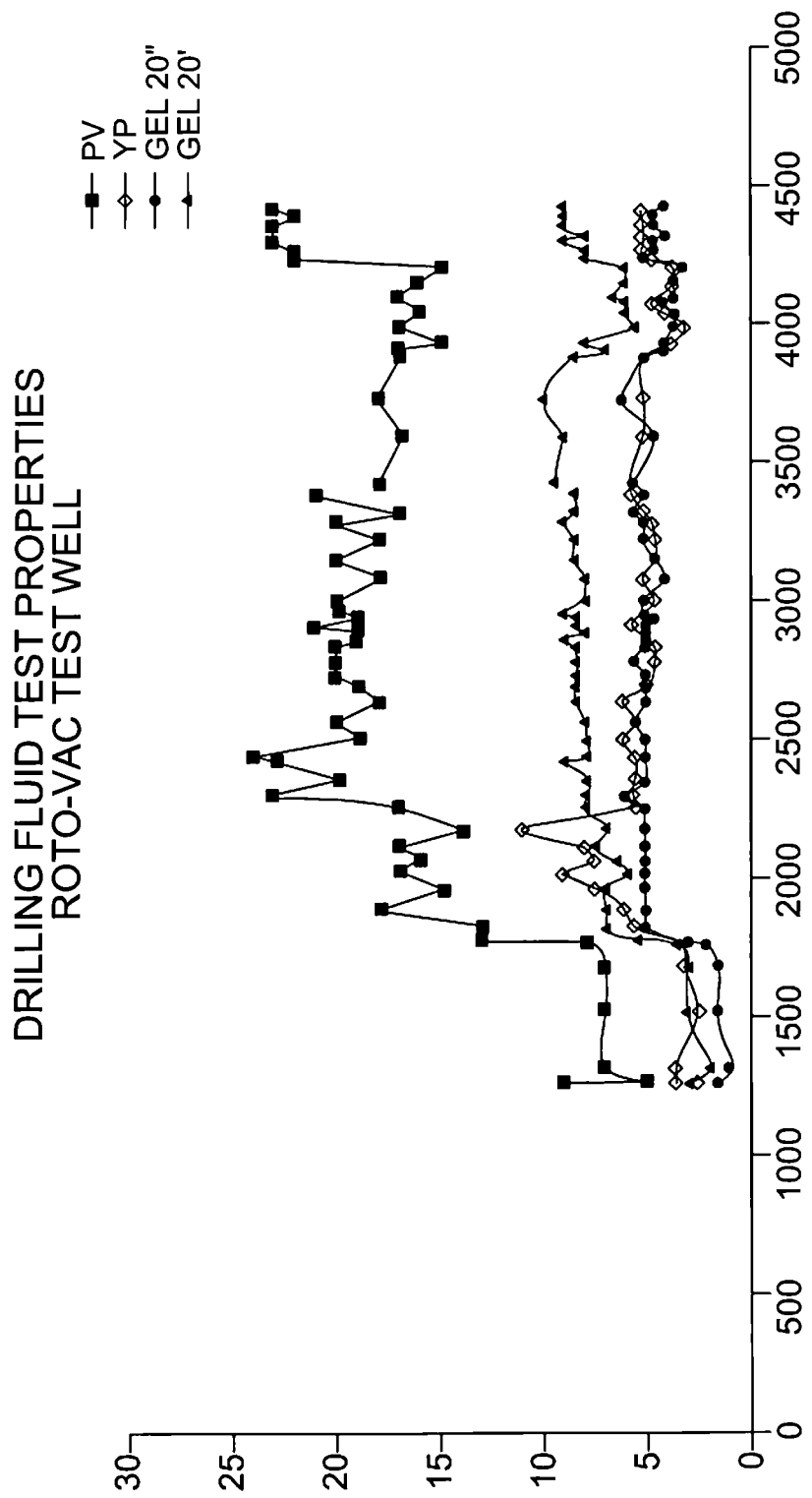
FIG. 8 is a graph showing drilling fluid parameters as a function of well depth for a drilling fluid subjected to a rotary vacuum separation.
Figure 9:
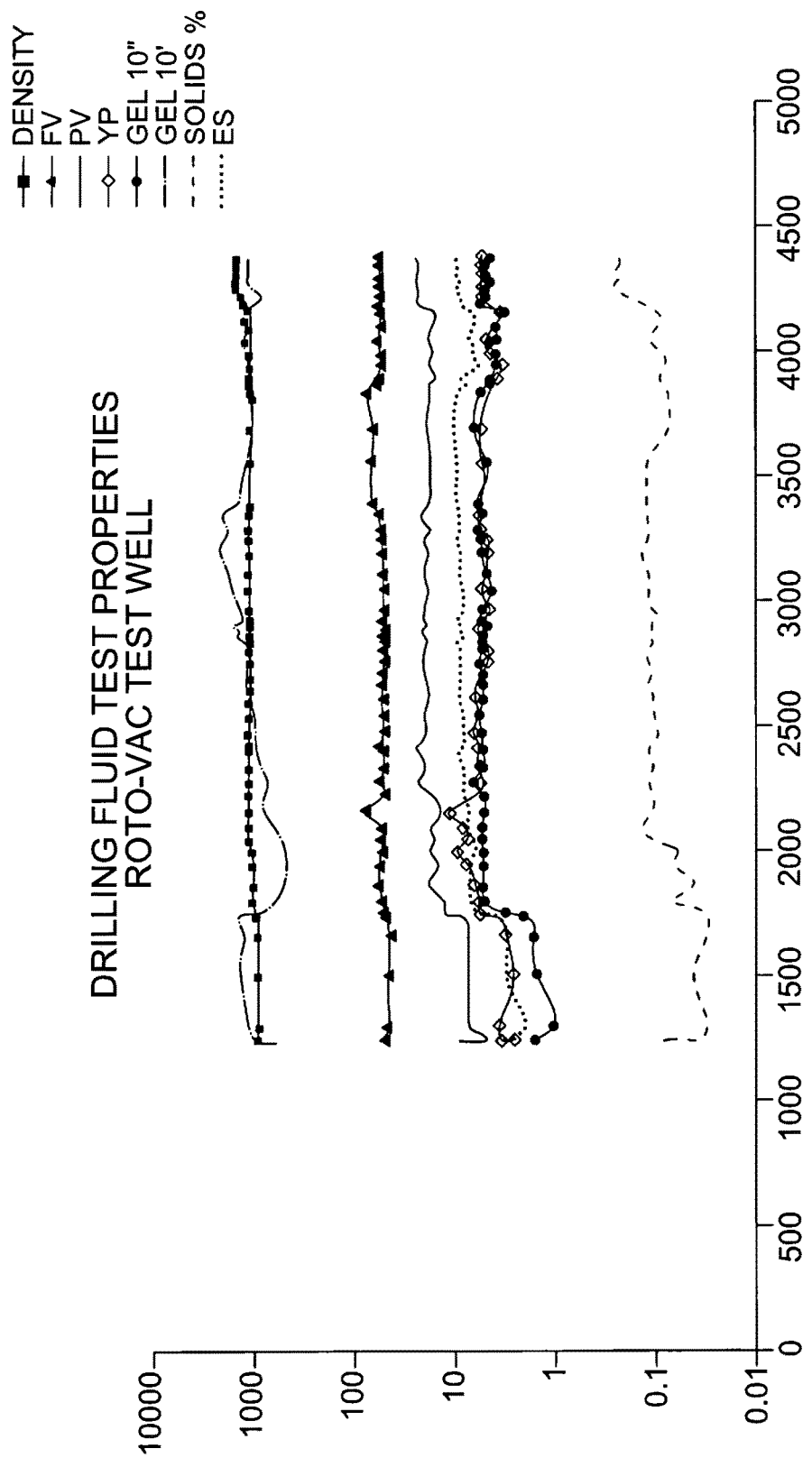
FIG. 9 is a graph showing drilling fluid parameters as a function of well depth for a drilling fluid subjected to a rotary vacuum separation.

As shown in FIGS. 8-11, a comparison between recovered drilling fluids from different screen systems are shown. FIGS. 8 and 9 show the effect of an aggressive screen separation technique using a rotary vacuum device in accordance with the prior art. In a rotary vacuum device, cuttings enter a rotating screen tube to which a high vacuum pressure is applied. Fluid is drawn off to the exterior of the tube as cuttings tumble over themselves during rotation of the tube.

Figure 10:
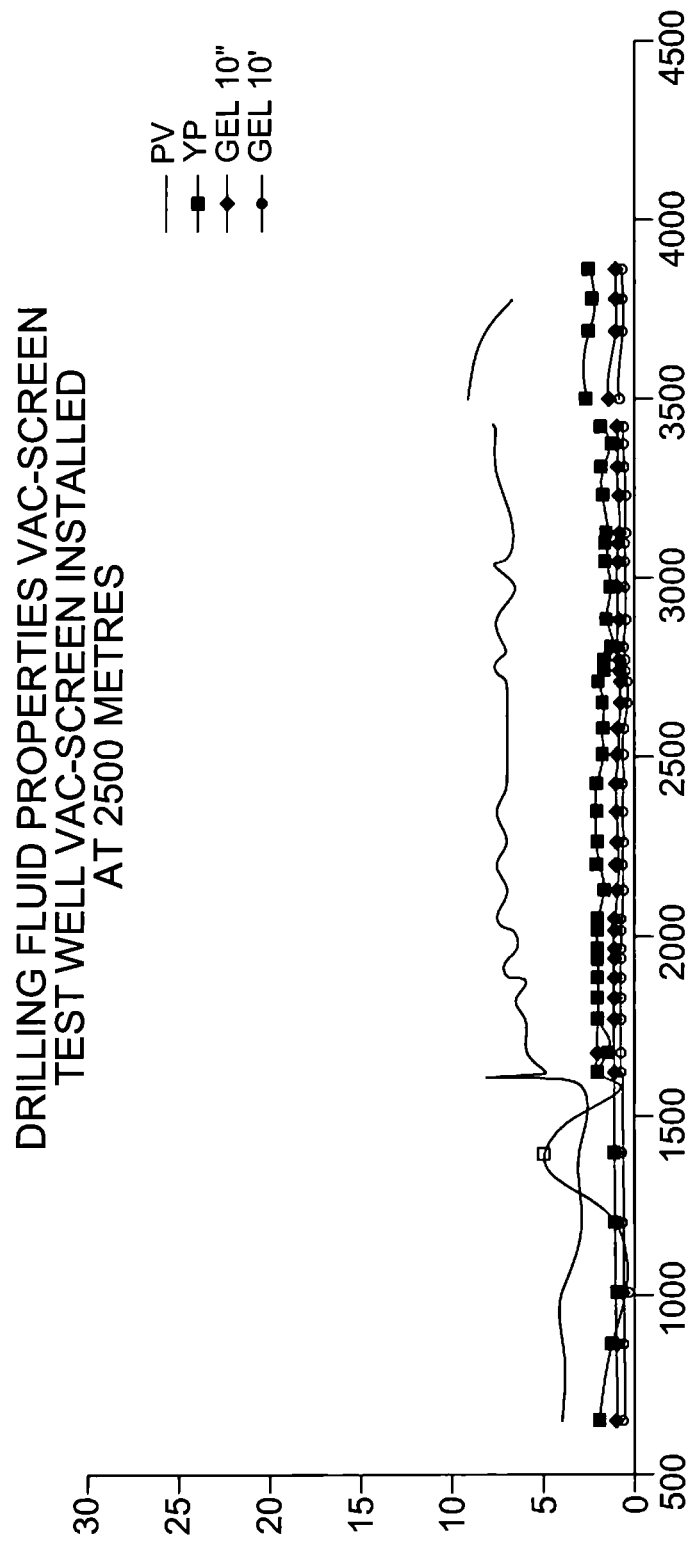
FIG. 10 is a graph showing drilling fluid parameters as a function of well depth for a drilling fluid subjected to a vacuum screen separation in accordance with one embodiment of the invention.
Figure 11:
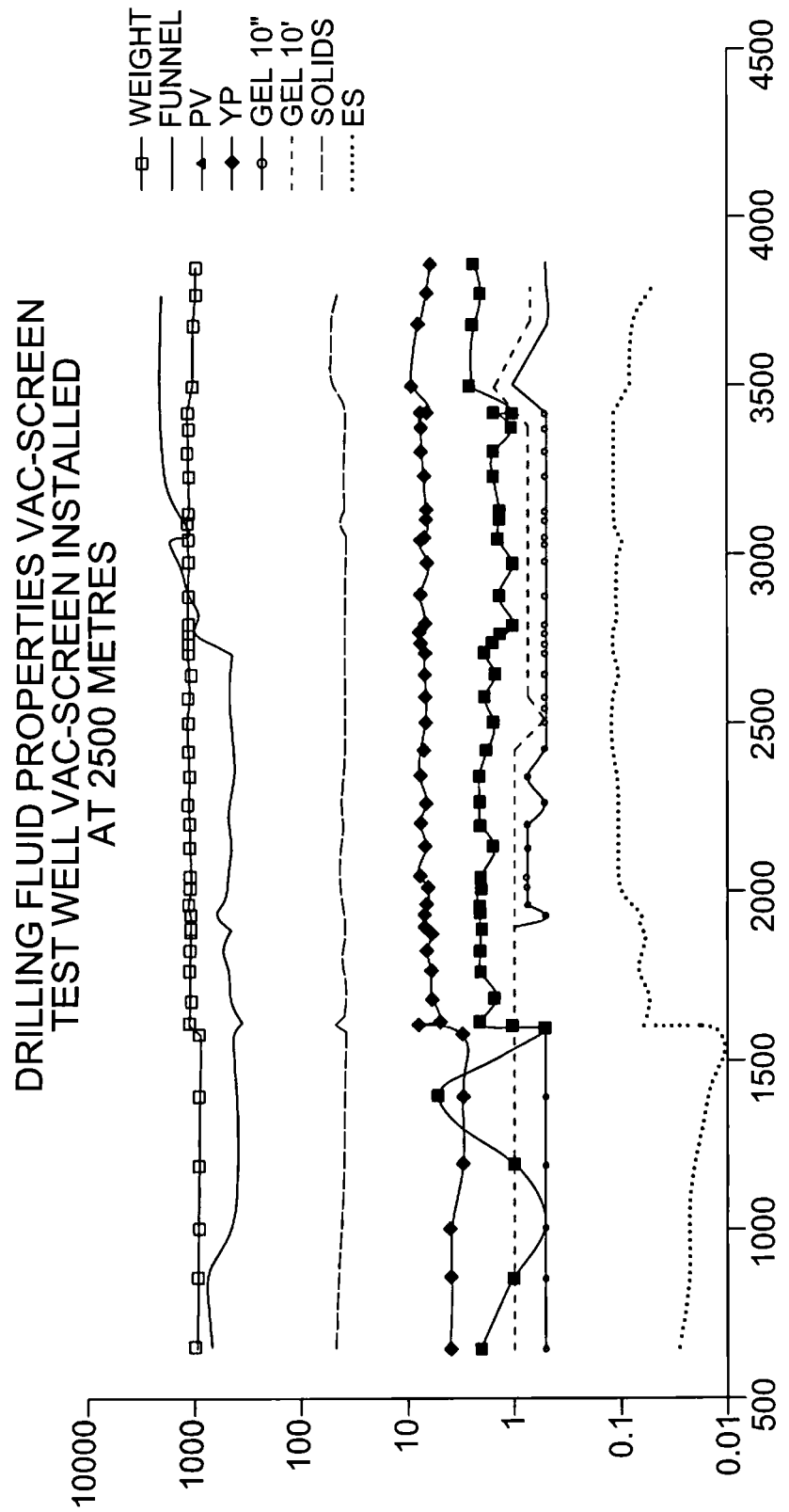
FIG. 11 is a graph showing drilling fluid parameters as a function of well depth for a drilling fluid subjected to a vacuum screen separation in accordance with one embodiment of the invention.

As shown in FIGS. 8 and 9, the properties of the drilling fluid (at a given depth) using rotary vacuum technologies are measured and graphed. The same properties were measured and graphed as shown in FIGS. 10 and 11 for a drilling fluid using screen vacuum technologies in accordance with the invention. As shown in FIGS. 8 and 9, rheological properties such as plastic viscosity (PV) and 10 minute gel strengths were significantly affected over time as a result of the physical degradation of the drill cuttings from the operation of the rotary vacuum machine where significant increases in both these values were measured. In comparison, as shown in FIGS. 10 and 11, PV and 10 minute gel strengths values remained stable for the subject technology. Emulsion stability was also favorable with the vacuum screen as shown by an increasing emulsion stability for the vacuum screen technology.

Thus, the subject technology addresses one of the key problems with past systems where aggressive separation of drilling fluids results in significant and detrimental effects on the drilling fluid rheology. That is, the subject technology preserves rheology and in particular plastic viscosity, 10 minute gel times and can improve emulsion stability, by substantially reducing fine solid concentrations in the recovered fluid such that the rheology of the recovered fluid is not significantly affected.

Further still, in order to the demonstrate the reduction in fines production, a post processing comparison of the drilling fluid recovered by a rotary vacuum device and a vacuum screen device using a standard centrifuge revealed that drilling fluid recovered from a vacuum screen had a fraction (less than 10% of the volume) of the fines compared to a rotary vacuum device.

Figure 13:
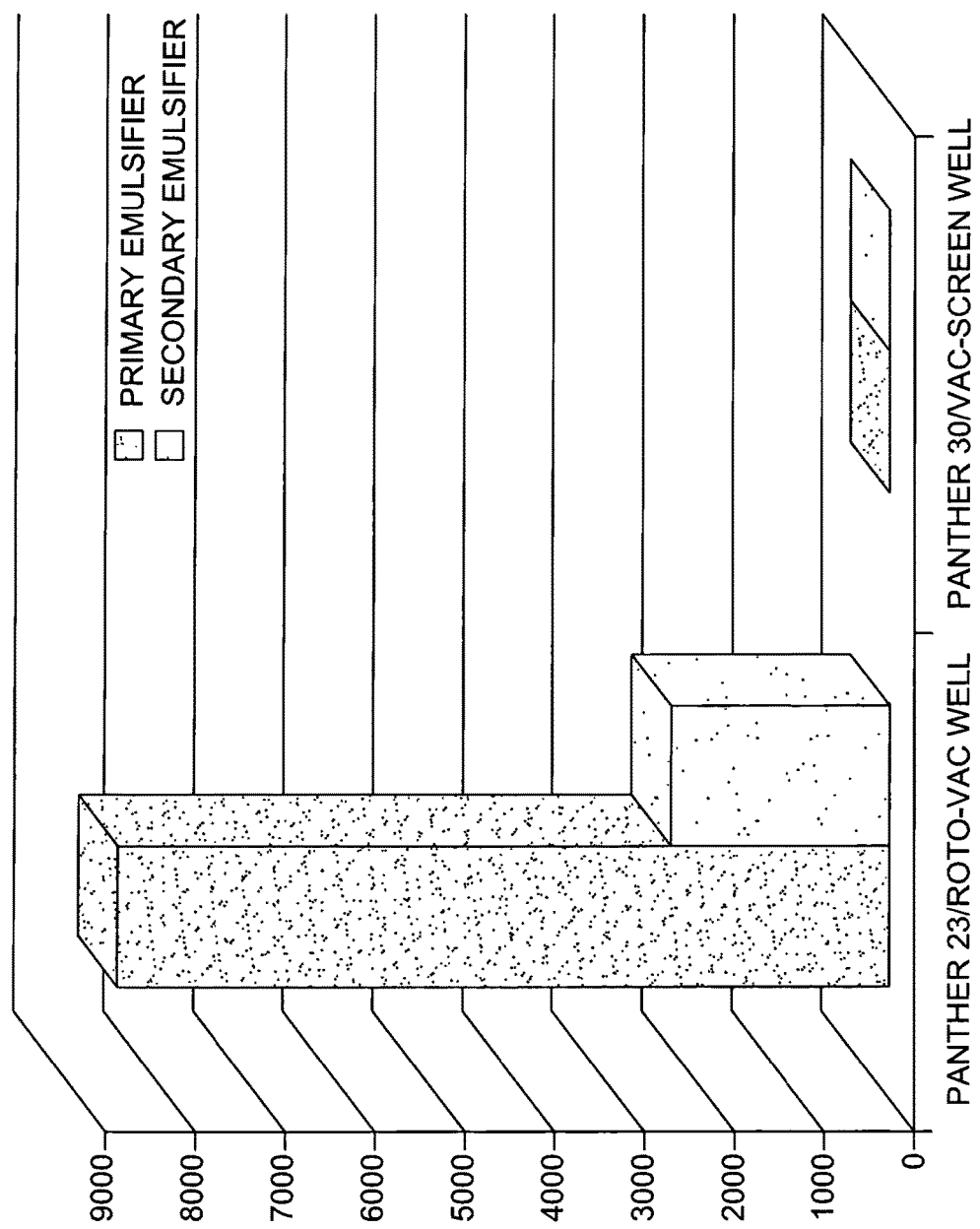

Further still, the use of a vacuum screen in accordance with the invention can also have a positive effect on fluid rheology by promoting the oxidation of fatty acids in an oil-based drilling fluid which can improve emulsifier usage in a well. With reference to FIG. 13, a comparison of primary and secondary emulsifier usage in wells that utilized vacuum screen and roto-vac separation technologies is shown. As shown, the vacuum screen required none or minimal additional emulsifiers to be added to the recovered drilling fluids during the course of drilling whereas the roto-vac well required additional emulsifiers. In particular, in cases where fatty acid emulsifiers can be oxidized, the use of vacuum screens can assist in the oxidation of those fatty acids by providing high air flow and drilling fluid mixing that promotes fatty acid oxidation. For example, the result of improved oxidation of unsaturated fatty acid emulsifiers can be improved emulsification properties to the re-cycled drilling fluid after such drilling fluids are re-introduced to the well. That is, as fatty acids are oxidized, the oxidation counteracts the potential detrimental effects of cuttings thus contributing to a more consistent fluid viscosity that does not require the addition of further emulsifiers and thus improves the chemical maintenance costs of a drilling program.

Other Design and Operational Considerations

Adjustable Vacuum

It is understood that an operator may adjust the vacuum pressure, screen size and/or vacuum area in order to optimize drilling fluid separation for a given field scenario.

Further still, in other embodiments the vacuum pressure and location can be adjusted based on the relative area of the vacuum manifold with respect to the underside of a screen. For example, a vacuum manifold may be provided with overlapping plates that would allow an operator to effectively widen or narrow the width of the manifold such that the open area of the manifold could be varied during operation through an appropriate adjustment system so as to enable the operator to optimize the cutting/fluid separation and, in particular, the time that the cuttings are exposed to a vacuum pressure.

Screen Cleaning

Another noted advantage of the system is the decreased requirement for screen cleaning. As is known in the field, un-modified shaker systems require that a screen, and in particular the downstream areas of a screen, be cleaned periodically due to screen clogging. In comparison, because of the vacuum system, screen cleaning is not required as often which in the case of hydrocarbon based fluids will minimize the health risks of damaging mists being inhaled by the person performing this task.

Screen Size Selection

Ultimately, the selection of screen size will be made predominantly on the basis of drilling fluid viscosity wherein an operator may choose a finer screen for lower viscosity fluids and a coarser screen for higher viscosity fluids. However, the operator will generally choose the finest screen for a given viscosity of drilling fluid that will provide a desired or optimal fluid retained on cuttings value.

Screen Design

Further, in that shaker baskets tend not to be all of an equal size even within specific models of shakers, various modifications can be made the design of the screen to ensure that cuttings do not work their way between gaps that may exist within the equipment. For example, a gap can often exist between the edge of the screen and the shaker basket such that cuttings/drilling fluid transit this gap and work their way between the screen and the vacuum manifold; even with a gasket installed. Thus, in various deployments and/or different model shakers, improved sealing systems may be required such as a raised-lip up from the manifold into the screen body to improve the seal and/or the addition of gasket material to the side of the screen between the screen side and the basket to prevent solids from falling into the lower tray area.

Gas Detector

It is also preferred to include a gas detector 101 in the receiving area of the vacuum and/or beneath the screen to detect buildup of harmful gases within the chamber. The gas detector can be used as a warning system for an operator utilize degassing equipment.

Original Equipment

The embodiments described above have emphasized the ability to retro-fit the vacuum system to various designs of known shakers. However, the vacuum design may also be incorporated into new shaker designs as would be known to those skilled in the art. It is also understood that the ability to retro-fit the design to various existing designs of shakers may be limited by space limitations at the preferred downstream end of the shaker. However, many of the above described benefits can be realized with the vacuum system located at another region of the shaker including middle regions of the shaker bed.

Further still, other designs in the connection system between the vacuum manifold and screen beds can be implemented depending on the specific design of the shaker. For example, shakers having tensioned screens will utilize a different connection and sealing system to provide an effective connection to the underside of a screen.

Installation

It is also beneficial to install the vacuum system at a level below the height of the shaker to allow for collected fluid to flow as well as be drawn into the vacuum chamber. This would ensure that slow moving detritus/fluid would have less opportunity to collect in the hose system that exists between the vacuum system and the operative connection between the screen and vacuum.

Accelerometer/Strain Gauges

In another embodiment, the shaker is provided with one or more accelerometer and/or strain gauges operatively connected to one or more locations on the shaker. The gauges are configured to indirectly measure the relative mass of the combined drilling fluid and cuttings on the shaker so as to provide a qualitative and/or quantitative assessment of the mass of fluid/cuttings on the shaker at different locations. That is, by determining the mass of fluid/cuttings at one position and comparing it to the mass of fluid/cuttings at a different position, the relative degree of drilling fluids/cuttings separation may be determined. This data can be effective in controlling the operation of the shaker and/or vacuum system.

Composite Materials

In yet another aspect, the shaker may be constructed out of light weight materials such as composite materials as opposed to the steel currently used. The use of composite materials such as fiberglass, Kevlar and/or carbon fiber may provide a lower reciprocating mass of the shaker system (including the screen frame, and associated shaking members), allow for higher vibration frequencies to be employed by minimizing the momentum of the shaker and allow for more control of the amplitude of the shaker. That is, a composite design allows for higher vibrational frequencies to be transmitted to the drill cuttings and fluid that would result in a reduction of viscosity of the drilling fluids which are typically thixotropic in nature. The resulting decrease in viscosity would provide a greater degree of separation of fluid and cutting.

Still further, a composite shaker would be light enough to allow for strain gauge sensors and accelerometers to be located under the shake basket in order to track the flow of mass over the shaker in a way which would allow for the operator to know the relative amount of drilling detritus being discharged from the well on a continuous basis. This information in combination with the known drilling rate and hole size can be used for adjusting fluid properties; typically viscosity, to optimize the removal of cuttings from the well bore during the excavation process.

Although the present invention has been described and illustrated with respect to preferred embodiments and preferred uses thereof, it is not to be so limited since modifications and changes can be made therein which are within the full, intended scope of the invention.

What is claimed is:

1. A method of retro-fitting a shaker to include an air vacuum system, the air vacuum system for improving the separation of drilling fluid and drill cuttings on the shaker, the method comprising the steps of:
   a. installing a vacuum frame and manifold over screen support rails of a shaker;
   b. installing a screen on the vacuum frame and manifold such that the vacuum frame and manifold mates with the underside of the screen; and
   c. securing each of the support rails, vacuum screen and manifold and screen together for enabling a vacuum pressure to be applied to the underside of the screen;
   wherein the shaker has at least two pairs of support rails and the vacuum frame and manifold is installed on a downstream pair of support rails, leaving at least one upstream pair of support rails without a vacuum frame and manifold.

2. The method as in claim 1, wherein the vacuum frame and manifold includes a vacuum hose port and the method further comprises the step of attaching a vacuum hose to the vacuum hose port.

3. The method as in claim 1, wherein the shaker has at least three pairs of support rails.

4. The method as in claim 3, wherein the shaker has at least four pairs of support rails.

5. The method as in claim 1, wherein the vacuum frame and manifold is installed in a middle region of the shaker.

6. The method as in claim 2, further comprising the step of applying a vacuum to the vacuum hose to draw an effective volume of air through the vacuum screen to enhance the flow of drilling fluid through the vacuum screen and the separation of drilling fluid from drill cuttings.

7. The method of claim 6, further comprising the step of introducing air into the vacuum hose to control the vacuum pressure.

8. The method of claim 1, wherein the vacuum frame and manifold is installed such that a vacuum manifold of the vacuum frame and manifold is adjacent to a downstream end of the shaker.

9. A method of retro-fitting a shaker to include an air vacuum system, the air vacuum system for improving the separation of drilling fluid and drill cuttings on the shaker, the method comprising the steps of:
   a. installing a vacuum frame and manifold over screen support rails of the shaker;
   b. installing a screen on the vacuum frame and manifold such that the vacuum frame and manifold mates with the underside of the screen; and
   c. securing each of the support rails, vacuum screen and manifold and screen together for enabling a vacuum pressure to be applied to the underside of the screen;
   wherein the shaker has one or more screens that combined have a total screen length, and the vacuum frame and manifold is installed such that a vacuum manifold of the vacuum frame and manifold extends less than 33% of the total screen length of the shaker.

10. The method of claim 9, wherein the vacuum manifold extends at least 5% of the total screen length of the shaker.

11. The method of claim 9, wherein the shaker has at least two pairs of support rails and the vacuum frame and manifold is installed on a downstream pair of support rails, leaving at least one upstream pair of support rails without a vacuum frame and manifold.

12. The method of claim 9, wherein the vacuum frame and manifold includes a vacuum hose port and the method further comprises the step of attaching a vacuum hose to the vacuum hose port.

13. The method of claim 11, wherein the shaker has at least three pairs of support rails.

14. The method of claim 13, wherein the shaker has at least four pairs of support rails.

15. The method of claim 9, wherein the vacuum frame and manifold is installed in a middle region of the shaker.

16. The method of claim 12, further comprising the step of applying a vacuum to the vacuum hose to draw an effective volume of air through the vacuum screen to enhance the flow of drilling fluid through the vacuum screen and the separation of drilling fluid from drill cuttings.

17. The method of claim 16, further comprising the step of introducing air into the vacuum hose to control the vacuum pressure.

* * * * *